(12) United States Patent
Sheik et al.

(10) Patent No.: US 12,063,567 B2
(45) Date of Patent: Aug. 13, 2024

(54) TECHNIQUES FOR CELL ACQUISITION

(71) Applicant: QUALCOMM Incorporated, San Diego, CA (US)

(72) Inventors: Ansah Ahmed Sheik, Hyderabad (IN); Gaurav Chaudhary, Hyderabad (IN); Sayak Saha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 17/553,244

(22) Filed: Dec. 16, 2021

(65) Prior Publication Data
US 2023/0199604 A1 Jun. 22, 2023

(51) Int. Cl.
*H04W 36/32* (2009.01)
*H04W 36/00* (2009.01)
*H04W 36/08* (2009.01)
*H04W 48/16* (2009.01)
*H04W 48/20* (2009.01)

(52) U.S. Cl.
CPC ....... *H04W 36/32* (2013.01); *H04W 36/0079* (2018.08); *H04W 36/00835* (2018.08); *H04W 36/08* (2013.01); *H04W 48/16* (2013.01); *H04W 48/20* (2013.01)

(58) Field of Classification Search
CPC ............. H04W 36/32; H04W 36/0079; H04W 36/00835; H04W 36/08; H04W 48/16; H04W 48/20; H04W 48/12
USPC ................................ 370/331; 455/435.1–444
See application file for complete search history.

(56) References Cited

U.S. PATENT DOCUMENTS

| | | | |
|---|---|---|---|
| 2006/0252430 A1* | 11/2006 | Barreto | H04W 72/30 455/450 |
| 2020/0359303 A1* | 11/2020 | Hong | H04W 48/16 |
| 2021/0092670 A1* | 3/2021 | Fujishiro | H04W 48/16 |
| 2021/0282064 A1* | 9/2021 | Wang | H04W 36/32 |

* cited by examiner

*Primary Examiner* — Michael Y Mapa
(74) *Attorney, Agent, or Firm* — QUALCOMM Incorporated

(57) ABSTRACT

Methods, systems, and devices for wireless communications are described. A network entity may support communications with a user equipment (UE) that is moving at a first speed that meets or exceeds a threshold via a cell that is configured to support such communications, which may be referred to as a high speed train (HST) cell. The network entity and the UE may support cell acquisition that prioritizes camping on an HST cell over a non-HST cell. The UE and the network entity may communicate acquisition signaling associated with establishing a connection with the network entity using a first frequency associated with an HST cell and a non-HST cell. Based on an identifier indicating that the HST cell is an HST cell, the UE may prioritize the HST cell over the non-HST cell during cell acquisition and establish the connection with the network entity via the HST cell.

26 Claims, 18 Drawing Sheets

TECHNIQUES FOR CELL ACQUISITION

FIELD OF TECHNOLOGY

The following relates to wireless communications, including techniques for cell acquisition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications between a network entity (e.g., a base station, transmission/reception point (TRP), a remote radio head (RRH)) and a UE moving at high speeds, such as while traveling on a high speed train (HST). To support such communications, the UE may establish a connection with the network entity via a cell that is configured to support the communications between the UE and the base station while the UE is moving at a high speed, which may be referred to as an HST cell. Improved cell acquisition techniques for camping on an HST cell may be desired.

SUMMARY

The described techniques relate to improved methods, systems, devices, and apparatuses that support techniques for cell acquisition. Generally, the described techniques provide for prioritizing high speed train (HST) cells when performing cell acquisition to reduce latency associated with camping on an HST cell. For example, a network entity may support communications with a user equipment (UE) that is moving at relatively high speeds (e.g., on an HST) via a cell configured to support such communications, which may be referred to as an HST cell. For instance, an HST cell may be a cell that is configured to support communications between the UE and the network entity while the UE is moving at a first speed that satisfies (e.g., meets or exceeds) a threshold. A non-HST cell may be a cell that is configured to support communications between the UE and the network entity while the UE is moving at a second speed slower than the first speed (e.g., and failing to satisfy the threshold).

To perform cell acquisition, the UE may communicate acquisition signaling with the network entity that is associated with establishing a connection with the network entity using a first frequency. The first frequency may be associated with at least an HST cell and a non-HST cell, and the UE may prioritize the HST cell over the non-HST cell when attempting to establish the connection using the first frequency. For example, the UE may maintain an HST database that tracks which frequencies are associated with (e.g., used to establish a connection with the network entity via) at least one HST cell. In some examples, the HST database may include identifiers that indicate which cells associated with a given frequency are HST cells. Based on an identifier indicating that the HST cell is an HST cell, the UE may prioritize camping on the HST cell over the non-HST cell, for example, even if the non-HST cell is associated with a first signal strength that is stronger than a second signal strength associated with the non-HST cell. For example, the identifiers may enable the UE to identify which cells associated with a frequency are HST cells prior to requesting and receiving a system information block (SIB) associated with a given cell. Accordingly, the UE may use the identifiers to avoid requesting, from the network entity, SIBs associated with connection establishment via a non-HST cell and instead may request SIBs associated with connection establishment via an HST cell, regardless of a signal strength associated with the non-HST cell.

DETAILED DESCRIPTION

Figure 1:
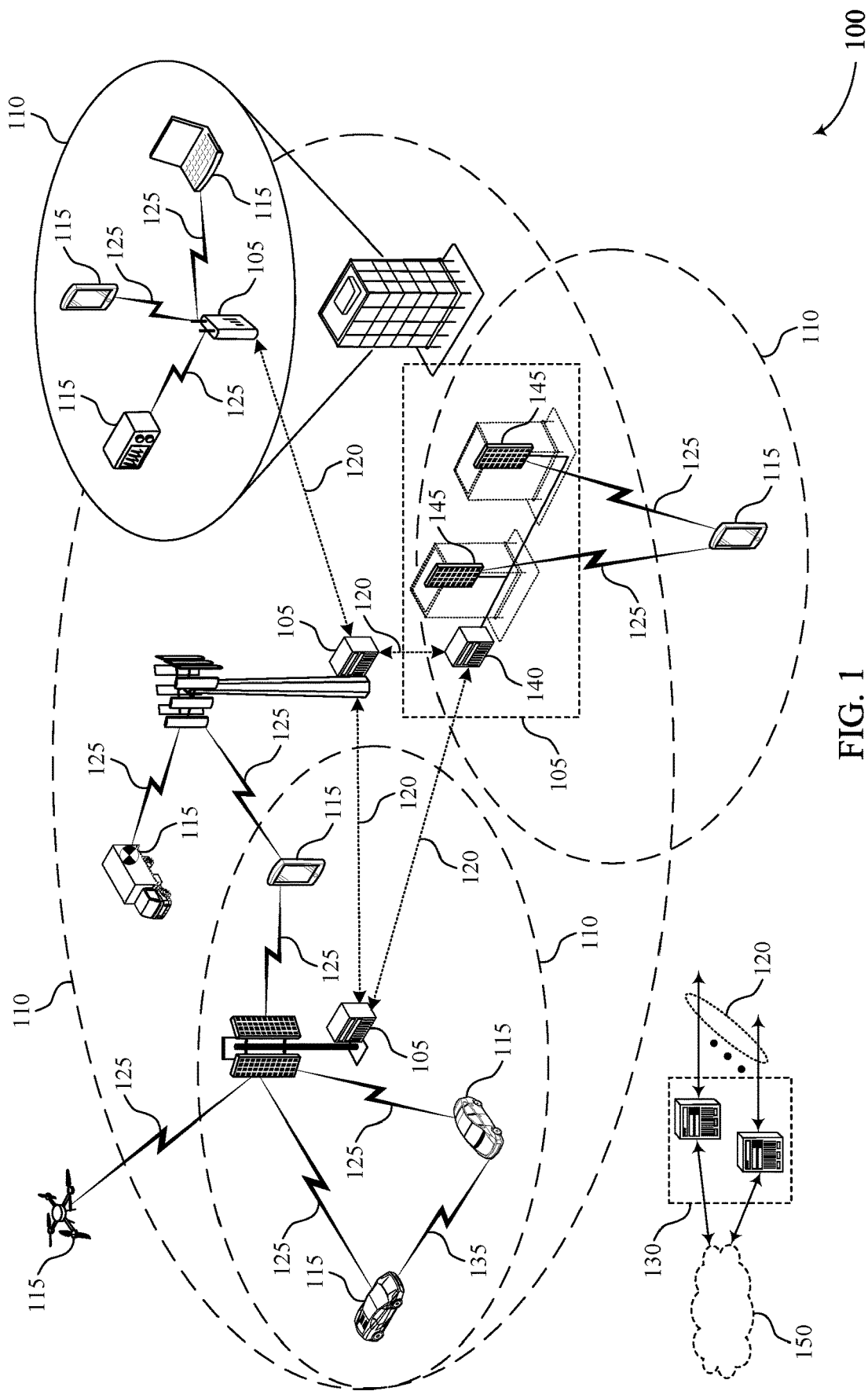
FIGS. 1 and 2 illustrate examples of wireless communications systems that support techniques for cell acquisition in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. In some examples, a UE may communicate with a network entity (e.g., a base station, transmission/reception point (TRP), a remote radio head (RRH)) while moving at relatively high speeds (e.g., such as while traveling on a high speed train (HST)). To support such communications, the UE may establish a connection with the network entity via an HST cell, which may refer to a cell that is configured to support communications between the UE and the network entity while the UE is moving at the relatively high speeds (e.g., at a first speed that meets or exceeds a threshold). Conversely, a non-HST cell may refer to a cell that is configured to support communications between the UE and the network entity while the UE is moving at relatively slower speeds (e.g., at a second speed less than the threshold).

The UE may perform a cell acquisition procedure to establish a connection with the network entity via a given cell, where connecting and communicating with a network entity via a cell may be referred to as camping on the cell. In some cases, a cell acquisition procedure to camp on an HST cell may include one or more (e.g., failed) attempts by the UE to camp on a non-HST cell before attempting to camp on the HST cell, thereby increasing a latency and a power consumption associated with camping on the HST cell. For example, a frequency used to communicate with the network entity may be associated with multiple cells, including both HST cells and non-HST cells. However, cell level information, such as whether a given cell associated with the frequency is an HST cell or a non-HST cell, may be unknown to the UE. Accordingly, in some cases, a cell acquisition procedure may indicate for the UE to attempt to camp on cells associated with the frequency according to an order that is based on a signal strength associated with each cell. For example, the UE may first attempt to camp on cells associated with higher signal strengths, even if the cell is a non-HST cell. To camp on a cell, the UE may transmit a request for the network entity to transmit a system information block (SIB) corresponding to the cell that includes the cell level information indicating whether the cell is an HST cell or a non-HST cell. If the cell is a non-HST cell, the UE may ignore camping on the cell and may proceed to attempt to camp on a cell having the next highest signal strength until the UE successfully camps on an HST cell. As a result, the UE may unnecessarily attempt to camp on non-HST cells, thereby delaying the UE from camping on an HST cell and increasing a power consumption associated with camping on the HST cell.

Techniques, systems, and devices are described herein to support HST cell prioritization when performing cell acquisition procedures. For example, a UE may maintain an HST database that is used to track which frequencies are associated with (e.g., may be used to establish a connection with a network entity via) at least one HST cell. The HST database may further include cell identifiers that indicate which cells of a given frequency in the HST database are HST cells. Accordingly, if attempting to camp on a cell using a given frequency in the HST database, the UE may use the cell identifiers to prioritize camping on HST cells over non-HST cells associated with the given frequency, for example, even if a first signal strength associated with a non-HST cell is stronger than a second signal strength associated with an HST cell.

For example, to establish a connection with a network entity using a first frequency that is associated with at least one HST cell and one non-HST cell, the UE may transmit a cell-specific acquisition message that requests for the network entity to indicate whether a known HST cell is available for camping. The cell may be a known HST cell based on a corresponding cell identifier being included in the HST database. If the HST cell is available for camping, the network entity may transmit an acquisition success message to the UE. In response, the UE may transmit a request for the network entity to transmit a SIB (e.g., a SIB1) corresponding to the known HST cell that includes additional information associated with communicating via the known HST cell (e.g., a public land mobile network (PLMN) identity and scheduling information, among other information included in the SIB). If the UE determines that the HST cell is suitable based on the SIB, the UE may camp on the known HST cell; otherwise, the UE may attempt to camp on a different known HST cell.

Alternatively, the UE may transmit a frequency-specific acquisition message that requests for the network entity to indicate which cells are associated with the first frequency. The UE may filter the non-HST cells from the indicated cells and may sort the HST cells associated with the first frequency according to signal strength. The UE may then attempt to camp on the HST cells according to the respective signal strengths.

Aspects of the subject matter described in this disclosure may be implemented to realize one or more of the following potential improvements, among others. The techniques employed by the UE and the network entity may provide benefits and enhancements to the operation of the UE and the network entity. For example, operations performed by the UE and the network entity may enable HST cell prioritization during cell acquisition, which may reduce latency and power consumption associated with HST cell camping. For instance, communicating and maintaining (e.g., storing, updating) cell identifiers that indicate which cells are HST cells may enable a UE to skip camping attempts on non-HST cells, thereby eliminating latency and power consumption associated with the non-HST cell camping attempts from a cell acquisition procedure. Additionally, in some examples, skipping non-HST cell camping attempts and prioritizing HST cell camping may improve resource utilization efficiency, for example, by reducing (e.g., eliminating) unnecessary signaling associated with the skipped non-HST cell camping attempts. In some examples, prioritizing HST cell camping during cell acquisition may further improve user experience by reducing HST cell reacquisition latency, thus reducing service interruption times that may occur. In some examples, prioritizing HST cell camping during cell acquisition may also increase battery life, improve coordination between the UE and the network entity, and reduce processing associated with HST cell camping, among other benefits.

Aspects of the disclosure are initially described in the context of wireless communications systems. Aspects of the disclosure are additionally described in the context of process flows. Aspects of the disclosure are further illustrated by and described with reference to apparatus diagrams, system diagrams, and flowcharts that relate to techniques for cell acquisition.

FIG. 1 illustrates an example of a wireless communications system 100 that supports techniques for cell acquisition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support communications between a UE 115 and multiple base stations 105. For example, the wireless communications system 100 may support single-frequency network transmissions in which more than one base station 105 (e.g., more than one TRP, more than one RRH) may transmit a same downlink transmission to the UE 115 over a same set of frequency resources. Thus, the UE 115 may receive a same downlink transmission from more than one base station 105. In some cases, this may increase a spatial diversity of the downlink transmission and may improve a reliability of the downlink transmission when compared to a downlink transmission that is transmitted by a single base station 105. In some examples, an SFN deployment may be used to increase a reliability of communications in an HST network. Here, RRHs may be placed along an HST track with multiple RRHs connected to a single base-band unit (BBU), which may process signals transmitted and received by the RRHs. This may increase the coverage area of a cell thereby reducing handover operations performed.

The wireless communications system 100 may support communications between a UE 115 and a network entity (e.g., a base station 105, a TRP, an RRH, among other network entities) via multiple types of cells. For example, the UE 115 and the network entity may communicate via an HST cell or via a non-HST cell. The UE 115 and the network entity may communicate via the HST cell in high-mobility scenarios, such as a scenario in which the UE 115 may be traveling in or on a vehicle at high speed (e.g., in or on a motor vehicle or an HST).

In order to communicate via a given cell, a UE 115 may perform a cell acquisition procedure to establish a connection with a network entity via the given cell, and thus may be camped on the given cell. To support camping on HST cells, a UE 115 may maintain (e.g., generate, store, update) an HST database that is used to track which frequencies are associated with (e.g., may be used to establish a connection with a network entity via) at least one HST cell. However, in some cases, the HST database may exclude any cell level information, such as whether a cell associated with a frequency is an HST cell or a non-HST cell. Here, the UE 115 may instead receive such cell level information in a SIB (e.g., a SIB1) transmitted by the network entity. As a result, the UE 115 may unnecessarily attempt to camp on non-HST cells before attempting to camp on HST cells associated with a given frequency.

For example, to camp on an HST cell, the UE 115 may access the HST database to determine one or more frequencies that are associated with an HST cell and may transmit a request for the network entity to indicate which cells associated with the determined frequencies are available for camping. The network entity may indicate both HST cells and non-HST cells associated with the determined frequencies that are available for camping, but whether each indicated cell is an HST cell or a non-HST cell may be unknown to the UE 115 (e.g., due to the cell level information being excluded from the HST database). The UE 115 may instead attempt to camp on the indicated cells according to respective signal strengths associated with the indicated cells (e.g., from a cell having a highest signal strength to a cell having a lowest signal strength). For example, the UE 115 may first transmit a request (e.g., a SIB1 read request) for the network entity to transmit a SIB1 corresponding to the cell having the highest signal strength. The SIB1 may include a flag that indicates whether the cell is an HST or a non-HST cell, and if the cell having the highest signal strength is a non-HST cell, the UE 115 may ignore camping on the cell and proceed to attempt to camp on a cell having the next highest signal strength. The UE 115 may continue such camping attempts until the UE 115 successfully camps on an HST cell. Thus, if the indicated cells include non-HST cells having signal strengths higher than signal strengths of indicated HST cells, the UE 115 may unnecessarily attempt to camp on such non-HST cells, thereby increasing a latency at which the UE 115 is able to camp on an HST cell.

To support enhanced HST cell camping, the UE 115 may be configured to perform a cell acquisition procedure that prioritizes HST cell camping over non-HST cell camping. For example, the UE 115 may maintain an HST database that further includes cell identifiers that indicate which cells of a given frequency in the HST database are HST cells. Accordingly, if attempting to camp on a cell using a given frequency in the HST database, the UE 115 may use the cell identifiers to prioritize camping on HST cells over non-HST cells associated with the given frequency, for example, even if a first signal strength associated with a non-HST cell is stronger than a second signal strength associated with an HST cell.

Figure 2:
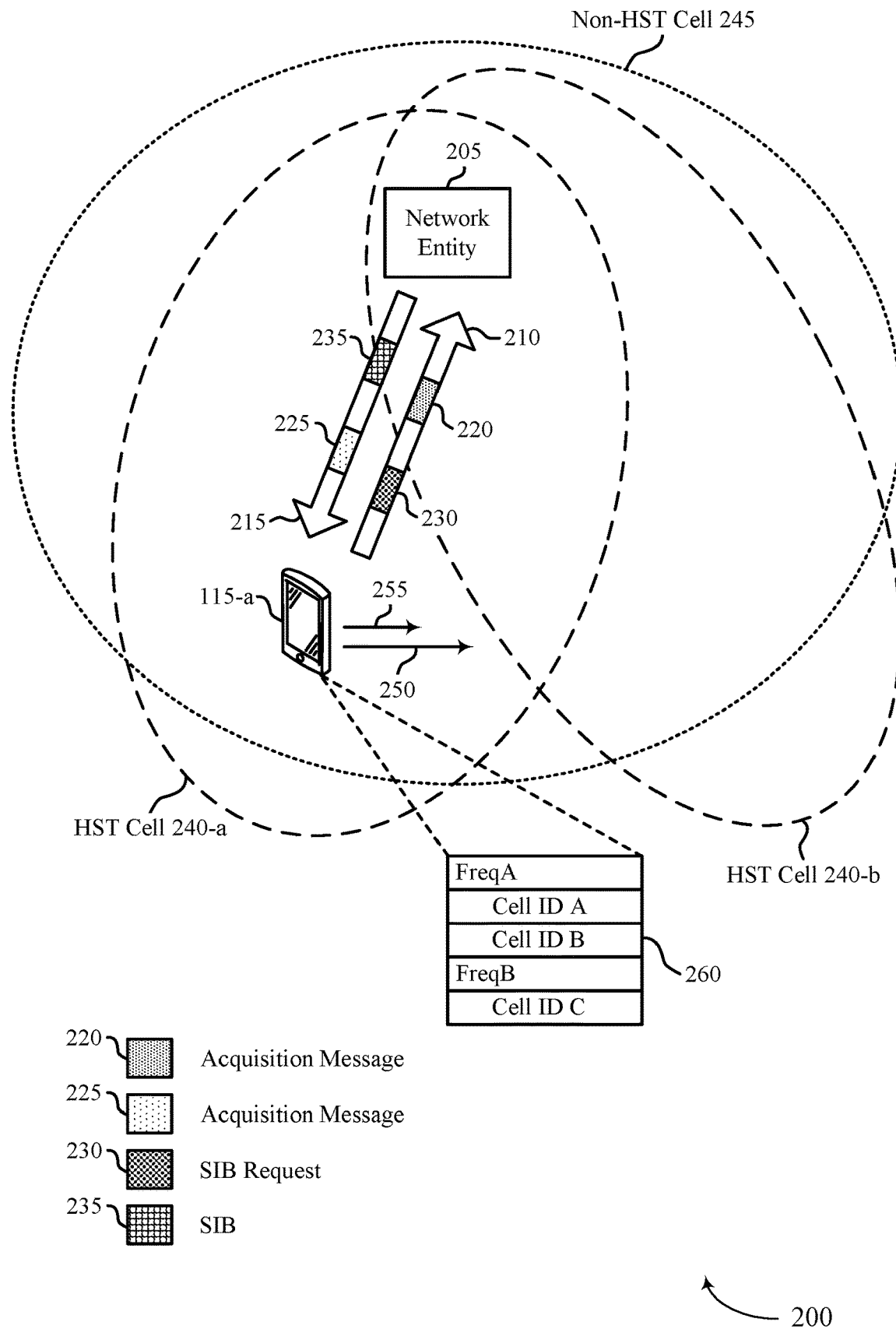

FIG. 2 illustrates an example of a wireless communications system 200 that supports techniques for cell acquisition in accordance with aspects of the present disclosure. The wireless communications system 200 may implement or be implemented by aspects of the wireless communications system 100. For example, the wireless communications system 200 may include a UE 115-a which may be an example of a UE 115 described with reference to FIG. 1. The wireless communications system 200 may also include a network entity 205, which may be an example of a base station 105, an access network entity 140, or an access network transmission entity 145 described with reference to FIG. 1. In some aspects, the wireless communications system 200 may support multiple RATs including 4G systems and 5G systems which may be referred to as NR systems. The wireless communications system 200 may support cell acquisition that prioritizes HST cells in order to reduce HST cell camping latency and power consumption, among other benefits.

The wireless communications system 200 may support communications between the UE 115-a and the network entity 205. For example, the UE 115-a may transmit uplink messages to the network entity 205 over a communication link 210 (which may be an example of a communication link 125 described with reference to FIG. 1) and may receive downlink messages from the network entity 205 on a communication link 215 (which may be an example of a communication link 125). In some examples, the communication link 210 may be an example of a physical uplink channel, such as a physical uplink control channel (PUCCH), a physical uplink shared channel (PUSCH), or a physical random access channel (PRACH), among other physical uplink channels. In some examples, the communication link 215 may be an example of a physical downlink channel, such as a physical downlink control channel (PDCCH), a physical downlink shared channel (PDSCH), a physical broadcast channel (PBCH), or a PRACH, among other physical downlink channels.

The wireless communications system 200 may support communications between the UE 115-a and the network entity 205 via various types of cells. The various types of cells may support various mobility scenarios of the UE 115-a. For example, the UE 115-a and the network entity 205 may communicate via an HST cell 240 or a non-HST cell 245. The UE 115-a may be configured to camp on an HST cell 240 to communicate with the network entity 205 in high mobility scenarios, such as while moving at a speed 250 that satisfies (e.g., meets or exceeds) a threshold. For example, in a high-speed network deployment, the UE 115-a may be traveling at speeds of 200-250 km/h or 300-350 km/h, among other examples. The UE 115-a may move at the high-speeds relative to the network entity 205 (e.g., and one or more additional network entities 205), which may result in Doppler effects (e.g., Doppler shifts, Doppler spreads) that impact communications between the UE 115-a and the network entity 205, among other impacts of the high-speeds of the UE 115-a. The HST cell 240 may be configured to compensate for the impact of the high-speeds of the UE 115-a on the communications between the UE 115-a and the network entity 205 (e.g., compensate for the resulting Doppler effects). For example, communication parameters such as scheduling information, resource configurations, and cell access information, among other communication parameters, may be adjusted for an HST cell 240 to compensate for the impact of the high-speeds of the UE 115-a, and thus may increase a reliability of communications between the UE 115-a and the network entity 205 while the UE 115-a moves at the high-speeds. Accordingly, if moving at the speed 250, the UE 115-a may establish a connection with the network entity 205 via the HST cell 240.

Alternatively, the UE 115-a may be configured to camp on a non-HST cell 245 if moving at a speed 255 that fails to satisfy (e.g., is less than) the threshold. For example, the impact of UE 115-a moving at high-speeds may be reduced or non-existent while the UE 115-a moves at the speed 255. Accordingly, the compensations provided by the HST cell 240 may be unnecessary in this scenario. As a result, the UE 115-a may camp on the non-HST cell 245 instead of the HST cell 240, for example, due to the non-HST cell 245 being configured to support communications between the UE 115-a and the network entity 205 while the UE 115-a moves at slower-speeds (e.g., the speed 255).

The UE 115-a may support cell camping using various frequencies. For example, a single frequency may be associated with multiple cells, including both HST cells 240 and non-HST cells 245. In other words, the UE 115-a may use a single a frequency to camp on multiple different cells at different times. For example, if a first frequency is associated with at least an HST cell 240-a and a non-HST cell 245, the UE 115-a may camp on the HST cell 240-a using the first frequency at a first time and may camp on the non-HST cell 245 using the first frequency at some second time (e.g., depending on a speed of the UE 115-a, a location of the UE 115-a, an availability of the HST cell 240-a and the non-HST cell 245, a respective signal strength of the HST cell 240-a and the non-HST cell 245, among other factors).

To support camping on HST cells 240, the UE 115-a may maintain (e.g., generate, store, update) an HST database 260 that tracks which frequencies are associated with at least one HST cell 240. For example, the HST database 260 may include an entry for a first frequency, FreqA, and an entry for a second frequency, FreqB, among other frequency entries (not shown). In some examples, the entry for a given frequency may be an absolute radio-frequency channel number (ARFCN) of the given frequency (e.g., an EARFCN). Storing an entry for a given frequency in the HST database 260 may indicate to the UE 115-a that the given frequency is associated with at least one HST cell 240. For example, the UE 115-a may access the HST database 260 to determine that the FreqA and the FreqB may each be used to camp on an HST cell 240 based on the HST database 260 including entries for the FreqA and the FreqB.

In some examples, the UE 115-a may store an entry for a given frequency in response to attempting to camp on an HST cell 240 (e.g., successfully or unsuccessfully) using the given frequency. For example, the UE 115-a may receive acquisition signaling indicating the cells that are associated with the given frequency. In some examples, the acquisition signaling may indicate which cells associated with the given frequency are HST cells 240. If at least one cell is indicated as being an HST cell 240, the UE 115-a may store the entry for the given frequency in the HST database 260. In some other examples, the UE 115-a may attempt to camp on the cells associated with the given frequency and may receive a SIB1 indicating whether a given cell is an HST cell 240. If the UE 115-a receives a SIB1 indicating that a cell associated with the given frequency is an HST cell 240, the UE 115-a may store the entry for the given frequency in the HST database 260, for example, regardless of whether the UE 115-a camps on the HST cell 240 as a result of receiving the SIB1. In some cases, the UE 115-a may store the entry for the given frequency in the HST database 260 if the UE 115-a successfully camps on an HST cell 240 associated with the given frequency.

The HST database 260 may additionally store entries for identifiers associated with HST cells 240. The HST database 260 may further indicate with which frequencies the identifiers are associated. For example, if the FreqA is associated with two HST cells 240, the HST database 260 may store an entry including a Cell ID A and an entry including a Cell ID B, where the Cell ID A corresponds to a cell identifier of a first HST cell 240 of the two HST cells 240 and the Cell ID B corresponds to a cell identifier of a second HST cell 240 of the two HST cells 240. If the FreqB is associated with a single HST cell 240, the HST database 260 may store an entry including a Cell ID C corresponding to a cell identifier of the single HST cell 240. The entries including the Cell IDs may be stored in the HST database 260 such that they are respectively associated with the FreqA and the FreqB (e.g., stored as subentries of the respective frequencies, stored sequentially following the respective frequency entries, among other storage methods). Accordingly, when accessing the HST database 260, the UE 115-a may determine which HST cells 240 are associated with which frequencies. In some examples, the UE 115-a may store an entry for a identifier corresponding to a given HST cell 240 in response to attempting to camp on the given HST cell 240 (e.g., successfully or unsuccessfully). In some other examples, the UE 115-a may store an entry for a identifier corresponding to a given HST cell 240 in response to receiving acquisition signaling that indicates the identifier, for example, regardless of whether the UE 115-*a* attempts to camp on the given HST cell 240.

In some examples, the HST database 260 include additional entries corresponding to additional parameters associated with the stored frequencies. For example, the HST database 260 may include entries that respectively indicate a subcarrier spacing associated with a given frequency, an identifier of a PLMN associated with the given frequency, or a time stamp associated with using the given frequency to camp on a cell. In some examples, the UE 115-*a* may maintain the HST database 260 at an RRC layer at the UE 115-*a*.

The UE 115-*a* and the network entity 205 may support prioritizing camping on HST cells 240 during cell acquisition. The UE 115-*a* and the network entity 205 may support the prioritization of camping on the HST cells 240 based on the identifiers associated with the HST cells 240 stored in the HST database 260. For example, the UE 115-*a* and the network entity 205 may communicate acquisition signaling associated with establishing a connection between the UE 115-*a* and the network entity 205 using a first frequency included in the HST database 260. For instance, the UE 115-*a* may access the HST database 260 to identify that FreqA and FreqB are associated with at least one HST cell 240 and may communicate the acquisition signaling with the network entity 205 to establish the connection using the FreqA or the FreqB.

In some examples of communicating the acquisition signaling, the UE 115-*a* may transmit, to the network entity 205, an acquisition message 220 that is a cell-specific acquisition message requesting for the network entity 205 to indicate whether a known HST cell 240 is available for camping. For example, the UE 115-*a* may access the HST database 260 to determine (e.g., identify, select) one of the stored identifiers associated with an HST cell 240. For instance, the UE 115-*a* may select the Cell ID A from the HST database 260 and may transmit the acquisition message 220 requesting for the network entity 205 to indicate whether an HST cell 240 corresponding to the Cell ID A (e.g., the HST cell 240-*a*, an HST cell 240-*b*) is available for camping. In some cases, the acquisition message 220 may include the Cell ID A to indicate for which HST cell 240 the UE 115-*a* is requesting the information. In response to receiving the acquisition message 220, the network entity 205 may transmit, to the UE 115-*a*, an acquisition message 225 indicating whether the known HST cell 240 (e.g., the HST cell 240-*a* corresponding to the Cell ID A) is available for camping.

If the known HST cell 240 is unavailable for camping, the UE 115-*a* may continue to select identifiers stored in the HST database 260 and transmit corresponding acquisition messages 220 until an HST cell 240 is indicated as available for camping. If the acquisition message 225 indicates that the known HST cell 240 is available for camping, the UE 115-*a* may attempt to camp on the known HST cell 240 (e.g., establish the connection with the network entity 205 via the known HST cell 240). For example, the UE 115-*a* may transmit a SIB request 230 that requests for the network entity 205 to transmit a SIB 235 (e.g., a SIB1) corresponding to the known HST cell 240. The SIB 235 may include additional information associated with communicating via the known HST cell 240 that may indicate whether the known HST cell 240 is suitable for camping by the UE 115-*a*. For example, the SIB 235 may include one or more of cell access parameters, cell identity information, cell selection information, a PLMN identity associated with the known HST cell 240, an indication that the known HST cell 240 is an HST cell 240, an indication of whether the UE 115-*a* is allowed to camp on the known HST cell 240, or scheduling parameters related to other system information (e.g., for other SIBs, such as a SIB2, a SIB3, a SIB4, and so on), among other information associated with communicating via the known HST cell 240. Based on the information included in the SIB 235, the UE 115-*a* may determine whether to camp on the known HST cell 240 or to attempt to camp on another known HST cell 240 (e.g., by transmitting another acquisition message 220 corresponding to another known HST cell 240). For example, based on the SIB 235, the UE 115-*a* may camp on the HST cell 240-*a* using the FreqA and in accordance with the information included in the SIB 235.

In this way, the UE 115-*a* may prioritize camping on HST cells 240 over non-HST cells 245 during cell acquisition. For example, the FreqA or the FreqB may be associated with one or more non-HST cells 245. But because the UE 115-*a* may access cell level information corresponding to the HST cells 240 associated with the FreqA and the FreqB via the HST database 260, the UE 115-*a* may bypass (e.g., refrain from, skip) attempting to camp on the one or more non-HST cells 245 and may instead attempt to camp on cells that are known to be HST cells 240.

In some other examples of communicating the acquisition signaling, the UE 115-*a* may transmit, to the network entity 205, an acquisition message 220 that is a frequency-specific acquisition message requesting for the network entity 205 to indicate which cells are associated with one or more frequencies included in the HST database 260 (e.g., and available for camping). For example, the UE 115-*a* may access the HST database 260 to determine (e.g., identify, select) one or more frequencies (e.g., the FreqA and/or the FreqB) that are known to be associated with at least one HST cell 240. The UE 115-*a* may transmit the acquisition message 220 to request for the network entity 205 to indicate which cells are associated with the determined one or more frequencies (e.g., one or more of the FreqA and the FreqB) and, for example, available for camping.

In response to receiving the acquisition message 220, the network entity 205 may transmit, to the UE 115-*a*, an acquisition message 225 indicating a set of cells that are associated with the determined one or more frequencies. The indicated set of cells may include a first subset of cells that are HST cells 240 and a second subset of cells that are non-HST cells 245. For example, both HST cells 240 and non-HST cells 245 may be available and associated with the determined one or more frequencies, and thus the acquisition message 225 may indicate both the first subset of HST cells 240 and the second subset of non-HST cells 245 to the UE 115-*a*. In some examples, the acquisition message 225 may further include a set of identifiers corresponding to the set of cells that indicate whether each cell of the set of cells is an HST cell 240 or a non-HST cell 245. In some examples, the set of identifiers may (e.g., exclusively) include identifiers that include the Cell IDs of HST cells 240 included in the set of cells, which the UE 115-*a* may store in the HST database 260.

In response to receiving the acquisition message 225, the UE 115-*a* may filter the set of cells to remove the second subset of non-HST cells 245 from the set of cells. For example, the UE 115-*a* may use the set of identifiers included in the acquisition message 225 to determine which cells of the set of cells are HST cells 240 (e.g., and which are non-HST cells 245) and may filter the HST cells 240 from the non-HST cells 245. Alternatively, the UE 115-a may access (e.g., reference) the HST database 260 to determine which cells of the set of cells are HST cells 240 (e.g., and which are non-HST cells 245) and may filter the HST cells 240 from the non-HST cells 245. In some examples, the UE 115-a may sort the remaining HST cells 240 according to respective signal strengths associated with each HST cell 240 (e.g., from a first HST cell 240 having a highest signal strength to a second HST cell 240 having a lowest signal strength).

The UE 115-a may attempt to camp on the sorted HST cells 240. For example, the UE 115-a may transmit a SIB request 230 that requests for the network entity 205 to transmit a SIB 235 (e.g., a SIB1) corresponding to the first HST cell 240 having the highest signal strength. The network entity 205 may transmit the SIB 235 to the UE 115-a, and the UE 115-a may determine whether the first HST cell 240 is suitable for camping by the UE 115-a based on the information included in the SIB 235. If the first HST cell 240 is suitable, the UE 115-a may camp on the first HST cell 240. Otherwise, the UE 115-a may proceed to attempt to camp on an HST cell 240 having a next highest signal strength, and may continue such attempts until the UE 115-a successfully camps on an HST cell 240.

In this way, the UE 115-a may prioritize camping on HST cells 240 over non-HST cells 245 during cell acquisition. For example, the set of identifiers included in the acquisition message 225 and/or the identifiers included in the HST database 260 may enable the UE 115-a to bypass (e.g., refrain from, skip) attempting to camp on non-HST cells 245 indicated by the acquisition message 225, for example, by filtering the non-HST cells 245 from the HST cells 240 indicated by the acquisition message 225.

In some examples, the acquisition signaling communicated by the UE 115-a and the network entity 205 and the subsequent steps to camp on an HST cell 240 may be based on one or more of a location of the UE 115-a relative to the HST cell 240 and a direction of travel of the UE 115-a relative to the HST cell 240. For example, in some cases, if the UE 115-a is located relatively close to an edge (e.g., border) of the HST cell 240-a and is traveling towards the HST cell 240-b, the UE 115-a may transmit an acquisition message 220 that includes frequency-specific acquisition signaling rather than cell-specific acquisition signaling. In some examples, the UE 115-a may determine that the UE 115-a is located relatively close to the edge of the HST cell 240-a by measuring that a signal strength of the HST cell 240-a is decreasing while measuring that a signal strength of a neighboring HST cell 240 (e.g., the HST cell 240-b) is increasing (e.g., based on measuring a SIB4 or a SIB5 transmitted by the network entity 205). In some cases, if the UE 115-a is located relatively far from the edge of the HST cell 240-a (e.g., determined based on a signal strength of the HST cell 240-a), the UE 115-a may transmit an acquisition message 220 that includes cell-specific acquisition signaling rather than frequency-specific acquisition signaling.

Figure 3:
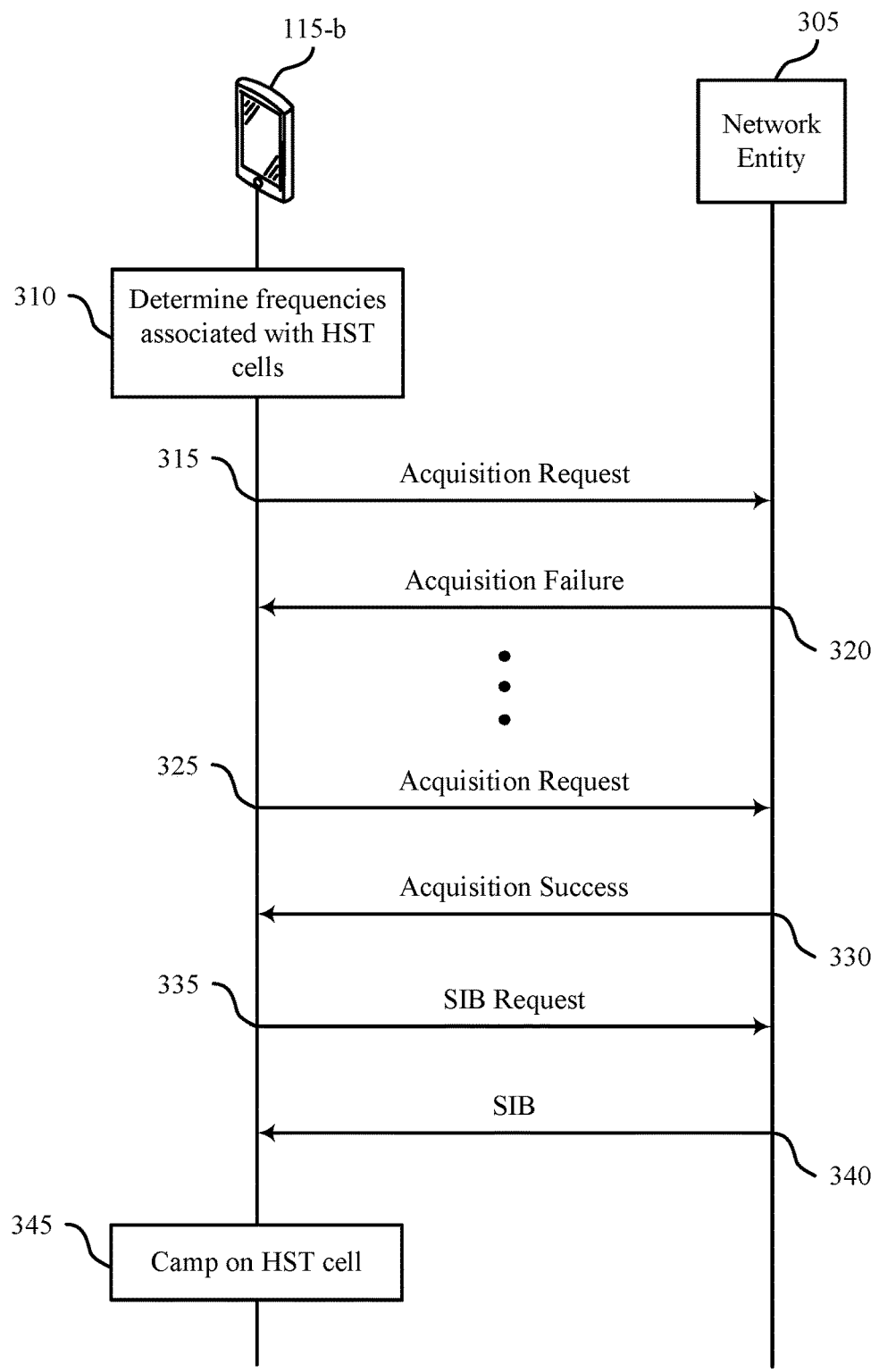
FIGS. 3 and 4 illustrate examples of process flows that support techniques for cell acquisition in accordance with aspects of the present disclosure.

FIG. 3 illustrates an example of a process flow 300 that supports techniques for cell acquisition in accordance with aspects of the present disclosure. The process flow 300 may implement or may be implemented by aspects of the wireless communications systems 100 and 200 as described with reference to FIGS. 1 and 2, respectively. For example, the process flow 300 may be implemented by a network entity 305 and a UE 115-b to support cell acquisition that prioritizes HST cells in order to reduce HST cell camping latency and power consumption, among other benefits. The process flow 300 may be an example of a cell acquisition procedure that implements cell-specific acquisition signaling in order to camp on an HST cell.

The network entity 305 and the UE 115-b may each be examples of a base station 105 or a network entity 205 and a UE 115 as respectively described herein, including with reference to FIGS. 1 and 2. In the following description of the process flow 300, the operations may be performed in different orders or at different times. Some operations also may be omitted from the process flow 300, and other operations may be added to the process flow 300. Further, although some operations or signaling may be shown to occur at different times for discussion purposes, these operations may actually occur at the same time.

At 310, the UE 115-b may determine (e.g., identify, select) one or more frequencies that are associated with at least one HST cell. For example, the UE 115-b may determine one or more frequencies that the UE 115-b may use to establish a connection with the network entity 305 via an HST cell. In some examples, the UE 115-b may determine the one or more frequencies by accessing (e.g., referencing, reading) an HST database that is stored and maintained at the UE 115-b. The HST database may track which frequencies are associated with at least one HST cell. The HST database may further include identifiers that indicate the HST cells associated with the tracked frequencies. For example, for each frequency included in the HST database, the HST database may include one or more cell identifiers corresponding to one or more HST cells that are associated with the frequency. In some examples, the UE 115-b may store and maintain a non-HST database that tracks which frequencies are not associated with at least one HST cell.

At 315, the UE 115-b may transmit an acquisition request to the network entity 305 requesting for the network entity 305 to indicate whether a first HST cell (e.g., selected from the HST database) is available for camping. For example, the acquisition request may be an example of a cell-specific acquisition message that requests the camping availability of an individual and known HST cell. In some examples, the UE 115-b may select HST cells from the HST database for requesting camping availability information based on a recency at which the UE 115-b camped on the HST cells. For example, the UE 115-b may first select a most recently camped on HST cell from the HST database and may attempt to camp on the most recently camped on HST cell. If camping fails, the UE 115-b may then select a next most recently camped on HST cell from the HST database and may attempt to camp on the next most recently camped on HST cell, and so on until the UE 115-b successfully camps on an HST cell.

For example, at 320, the network entity 305 may transmit an acquisition failure to the UE 115-b indicating that the first HST cell is unavailable camping. Accordingly, at 325, the UE 115-b may transmit a second acquisition request to the network entity 305 requesting for the network entity 305 to indicate whether a second HST cell (e.g., corresponding to a next most recently camped on HST cell included in the HST database) is available for camping. In some examples, the UE 115-b may continue to transmit acquisition requests to the network entity 305 corresponding to different HST cells until, at 330, the network entity 305 may transmit an acquisition success to the UE 115-b indicating, for example, that the second HST cell is available for camping.

At 335, in response to receiving the acquisition success, the UE 115-b may transmit a SIB request to the network entity 305 requesting for the network entity 305 to transmit a SIB (e.g., a SIB1) to the UE 115-*b* corresponding to the second HST cell (e.g., the HST cell indicated by the acquisition success).

At 340, the network entity 305 may transmit the SIB to the UE 115-*b* in response to receiving the SIB request. The SIB may include information that may indicate whether the second HST cell is suitable for camping by the UE 115-*b*. For example, the SIB may include one or more of cell access parameters, cell identity information, cell selection information, a PLMN identity associated with the second HST cell, an indication that the second HST cell is an HST cell, an indication of whether the UE 115-*b* is allowed to camp on the second HST cell, or scheduling parameters related to other system information (e.g., for other SIBs, such as a SIB2, a SIB3, a SIB4, and so on), among other information that may be included in a SIB1, for example.

At 345, the UE 115-*b* may determine that the second HST cell is suitable for camping and may camp on the second HST cell based on the determination. To camp on the second HST cell, the UE 115-*b* may communicate via the second HST cell in accordance with the information included in the SIB (e.g., the cell access parameters, the PLMN identity, the scheduling parameters, etc.). In some examples, if the UE 115-*b* determines that the second HST cell is unsuitable for camping, the UE 115-*b* may repeat 315 through 340 until the UE 115-*b* successfully camps on an HST cell.

Figure 4:
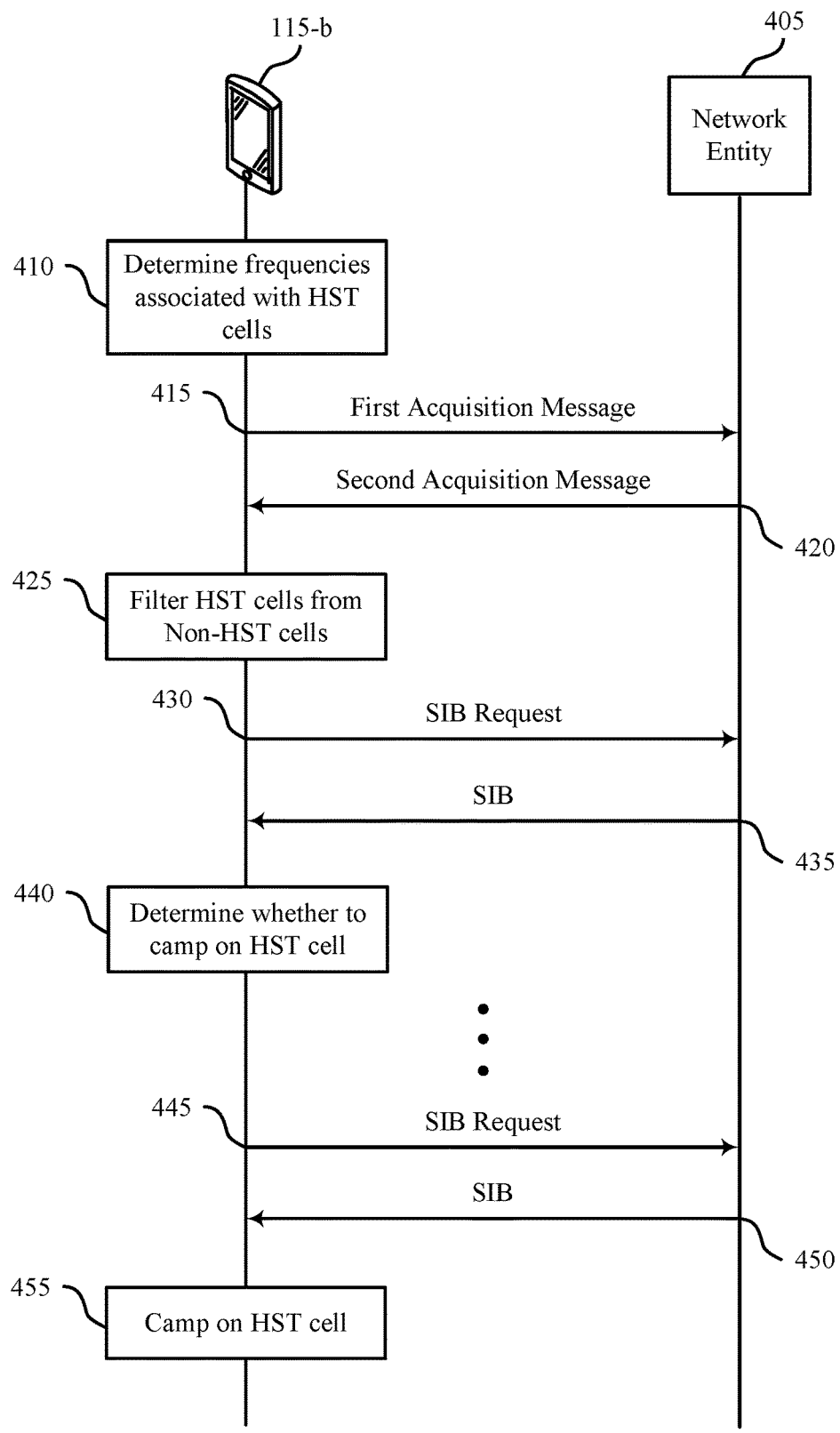

FIG. 4 illustrates an example of a process flow 400 that supports techniques for cell acquisition in accordance with aspects of the present disclosure. The process flow 400 may implement or may be implemented by aspects of the wireless communications systems 100 and 200 as described with reference to FIGS. 1 and 2, respectively. For example, the process flow 400 may be implemented by a network entity 405 and a UE 115-*c* to support cell acquisition that prioritizes HST cells in order to reduce HST cell camping latency and power consumption, among other benefits. The process flow 400 may be an example of a cell acquisition procedure that implements frequency-specific acquisition signaling in order to camp on an HST cell.

The network entity 405 and the UE 115-*c* may each be respective examples of a base station 105 or a network entity 205 and a UE 115 as respectively described herein, including with reference to FIGS. 1 and 2. In the following description of the process flow 400, the operations may be performed in different orders or at different times. Some operations also may be omitted from the process flow 400, and other operations may be added to the process flow 400. Further, although some operations or signaling may be shown to occur at different times for discussion purposes, these operations may actually occur at the same time.

At 410, the UE 115-*c* may determine (e.g., identify, select) one or more frequencies that are associated with at least one HST cell. For example, the UE 115-*c* may determine one or more frequencies that the UE 115-*c* may use to establish a connection with the network entity 405 via an HST cell. In some examples, the UE 115-*c* may determine the one or more frequencies by accessing (e.g., referencing, reading) an HST database that is stored and maintained at the UE 115-*c*. The HST database may track which frequencies are associated with at least one HST cell. The HST database may further include identifiers that indicate the HST cells associated with the tracked frequencies. For example, for each frequency included in the HST database, the HST database may include one or more cell identifiers corresponding to one or more HST cells that are associated with the frequency. In some examples, the UE 115-*b* may store and maintain a non-HST database that tracks which frequencies are not associated with at least one HST cell.

At 415, the UE 115-*c* may transmit a first acquisition message to the network entity 405 requesting for the network entity 405 to indicate which cells are associated with the determined frequencies. For example, the first acquisition message may be an example of a frequency-specific acquisition message that requests cell association of one or more frequencies included in the HST database.

At 420, in response to receiving the first acquisition message, the network entity 405 may transmit a second acquisition message that indicates the cells associated with the determined frequencies. For example, the second acquisition message may indicate a set of cells that includes one or more HST cells and may indicate which of the determined frequencies correspond to each of the one or more HST cells. In some examples, the set of cells may also include one or more non-HST cells and may indicate which of the determined frequencies correspond to each of the one or more non-HST cells. For example, the second acquisition message may indicate that a first HST cell, a second HST cell, and a first non-HST cell are associated with a first determined frequency and that a third HST cell and a second non-HST cell are associated with a second determined frequency (e.g., although any quantity of frequencies, HST cells, and non-HST cells may be indicated by the second acquisition message).

At 425, the UE 115-*c* may filter the one or more HST cells indicated by the second acquisition message from the one or more non-HST cells indicated by the second acquisition message. For example, the UE 115-*c* may remove the one or more non-HST cells from the indicated set of cells so that set of cells exclusively includes the one or more HST cells. In some examples, the UE 115-*c* may determine which cells of the indicated set of cells are the HST cells based on the HST database. For example, the UE 115-*c* may use the cell identifiers included in the HST database to determine which cells of the indicated set of cells are HST cells and may filter the remaining cells from the indicated set of cells. In some other examples, the UE 115-*c* may determine which cells of the indicated set of cells are the HST cells based on a set of cell identifiers included in the second acquisition message that indicates whether each cell is an HST cell or a non-HST cell. For example, the set of cell identifiers may include the cell identifiers of the HST cells included in the indicated set of cells. In some examples, the UE 115-*c* may order the filtered set of cells (e.g., the one or more remaining HST cells) from an HST cell having a greatest signal strength of the filtered set of cells to an HST cell having a lowest signal strength of the filtered set of cells.

At 430, the UE 115-*c* may transmit a SIB request to the network entity 405 requesting for the network entity 405 to transmit a SIB (e.g., a SIB1) to the UE 115-*c* corresponding to an HST cell of the filtered set of cells. In some examples, the UE 115-*c* may select the HST cell from the filtered set of cells according to the order from greatest signal strength to lowest signal strength. For example, the UE 115-*c* may first select the HST cell having the greatest signal strength and may transmit the SIB request to request the transmission of the SIB corresponding to the HST cell having the greatest signal strength.

At 435, in response to receiving the SIB request, the network entity 405 may transmit the SIB corresponding to the HST cell having the greatest signal strength to the UE 115-*c*, which may include information that may indicate whether the HST cell having the greatest signal strength is suitable for camping by the UE 115-*c*.

At 440, the UE 115-*c* may determine whether to camp on the HST cell having the greatest signal strength based on the SIB. In the example of FIG. 4, the UE 115-*c* may determine that the HST cell having the greatest signal strength is unsuitable for camping. Accordingly, the UE 115-*c* may select an HST cell of the filtered set of cells that has a next greatest signal strength and may transmit another SIB request for the transmission of a SIB corresponding to the HST cell having the next greatest signal strength.

The UE 115-*c* and the network entity 405 may continue to exchange SIB requests and SIBs corresponding to HST cells having subsequently next greatest signal strengths until the UE 115-*c* successfully camps on a suitable HST cell. For example, at 445, the UE 115-*c* may transmit the SIB request for the transmission of the SIB corresponding to the HST cell having the next greatest signal strength. At 450, the network entity 405 may transmit the SIB corresponding to the HST cell having the next greatest signal strength. At 455, the UE 115-*c* may determine that the HST cell having the next greatest signal strength is suitable for camping and may camp on the HST cell having the next greatest signal strength in accordance with the SIB corresponding to the HST cell having the next greatest signal strength.

Figure 5:
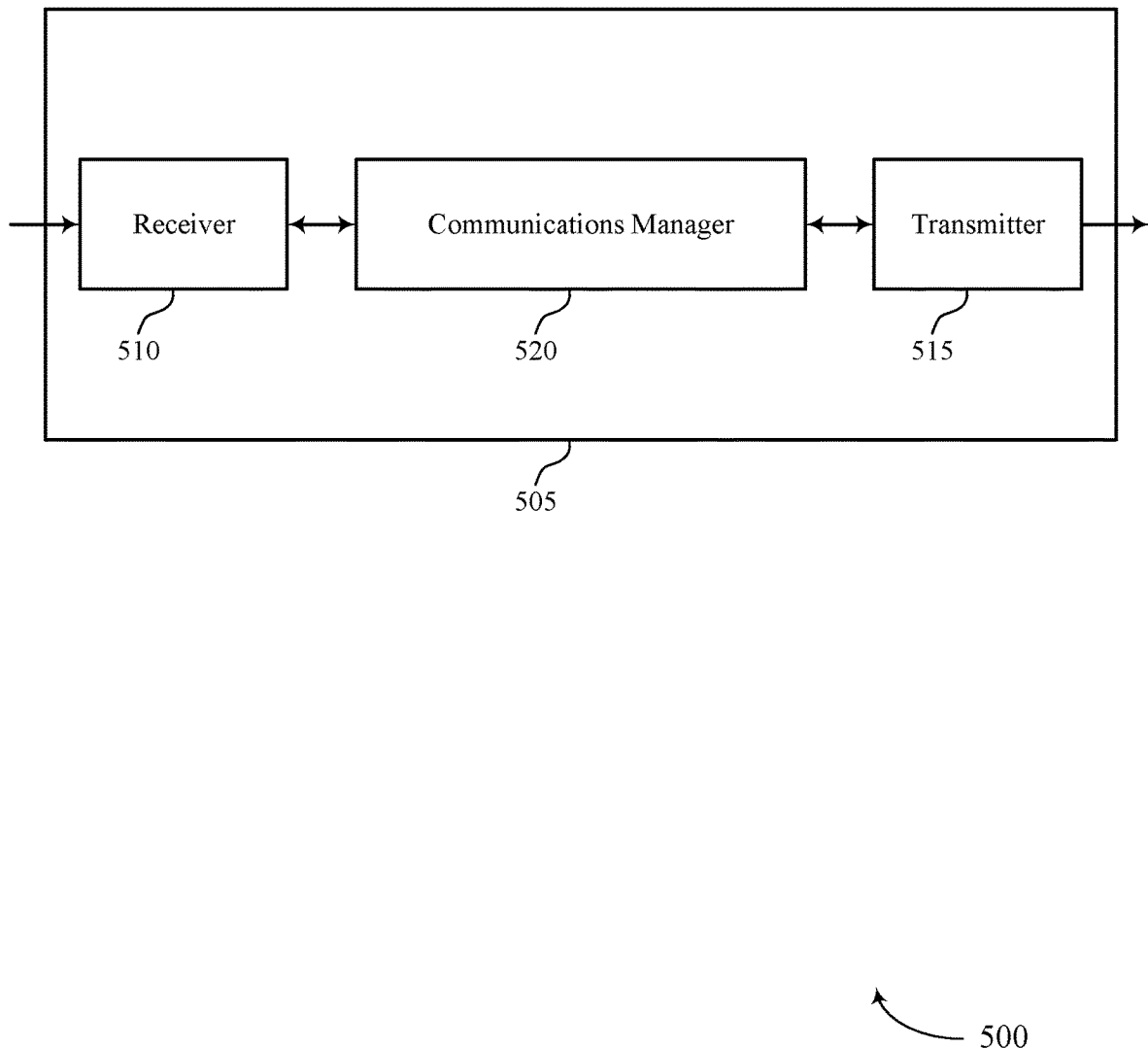
FIGS. 5 and 6 show block diagrams of devices that support techniques for cell acquisition in accordance with aspects of the present disclosure.

FIG. 5 shows a block diagram 500 of a device 505 that supports techniques for cell acquisition in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for cell acquisition). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for cell acquisition). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for cell acquisition as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for communicating, with a network entity, acquisition signaling associated with establishing a connection with the network entity using a first frequency, the first frequency associated with a first cell configured to support communications between the UE and the network entity while the UE moves at a first speed that satisfies a threshold (e.g., an HST cell) and a second cell configured to support communications between the UE and the network entity while the UE moves at a second speed that is less than the first speed (e.g., a non-HST cell). The communications manager 520 may be configured as or otherwise support a means for establishing the connection with the network entity via the first cell based on an identifier associated with the first cell, the identifier indicating that the first cell is configured to support the communications between the UE and the network entity while the UE moves at the first speed.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources, for example, by supporting the prioritization of camping on HST cells during cell acquisition.

Figure 6:
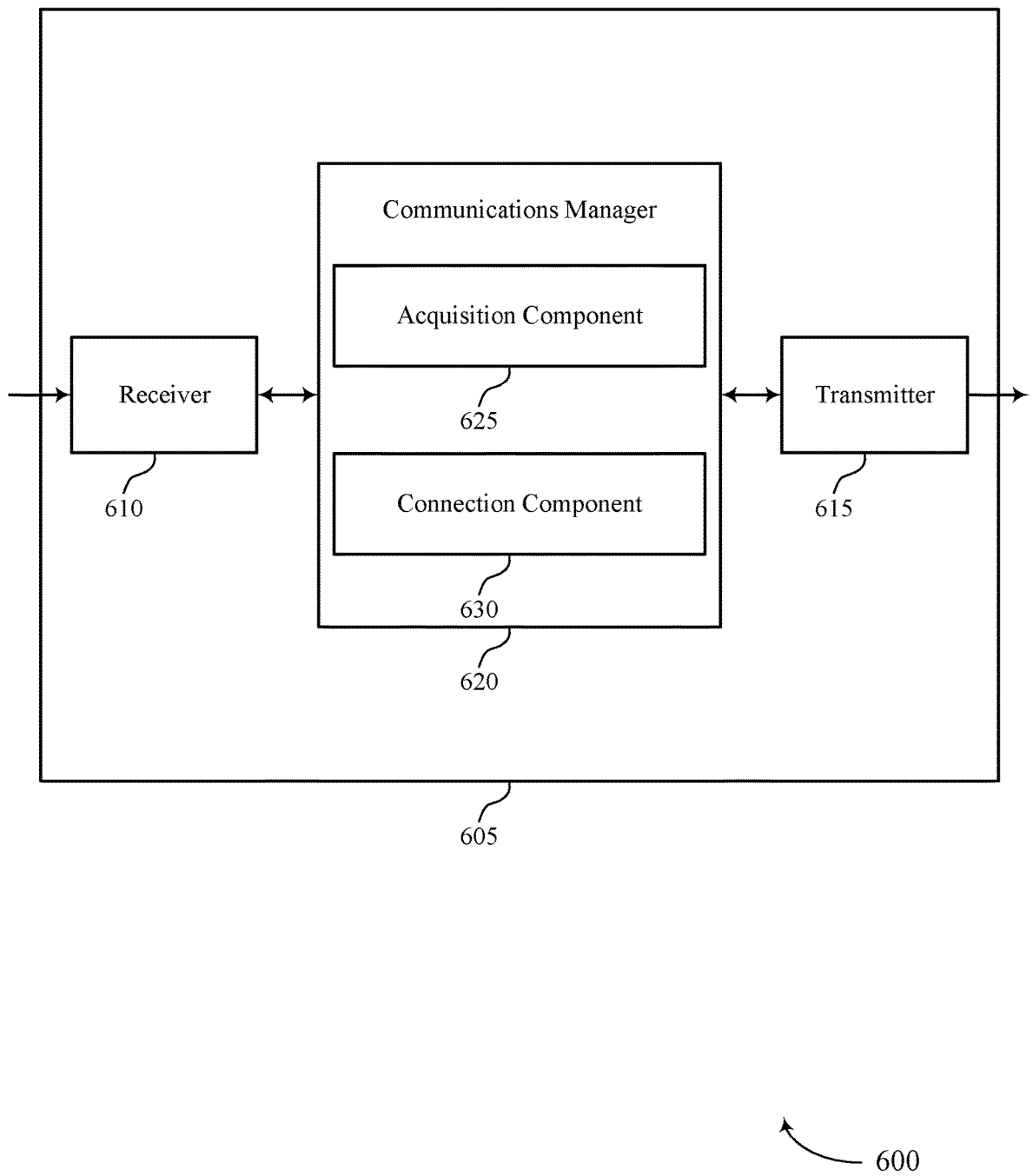

FIG. 6 shows a block diagram 600 of a device 605 that supports techniques for cell acquisition in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for cell acquisition). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for cell acquisition). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for cell acquisition as described herein. For example, the communications manager 620 may include an acquisition component 625 a connection component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The acquisition component 625 may be configured as or otherwise support a means for communicating, with a network entity, acquisition signaling associated with establishing a connection with the network entity using a first frequency, the first frequency associated with a first cell configured to support communications between the UE and the network entity while the UE moves at a first speed that satisfies a threshold (e.g., an HST cell) and a second cell configured to support communications between the UE and the network entity while the UE moves at a second speed that is less than the first speed (e.g., a non-HST cell). The connection component 630 may be configured as or otherwise support a means for establishing the connection with the network entity via the first cell based on an identifier associated with the first cell, the identifier indicating that the first cell is configured to support the communications between the UE and the network entity while the UE moves at the first speed.

Figure 7:
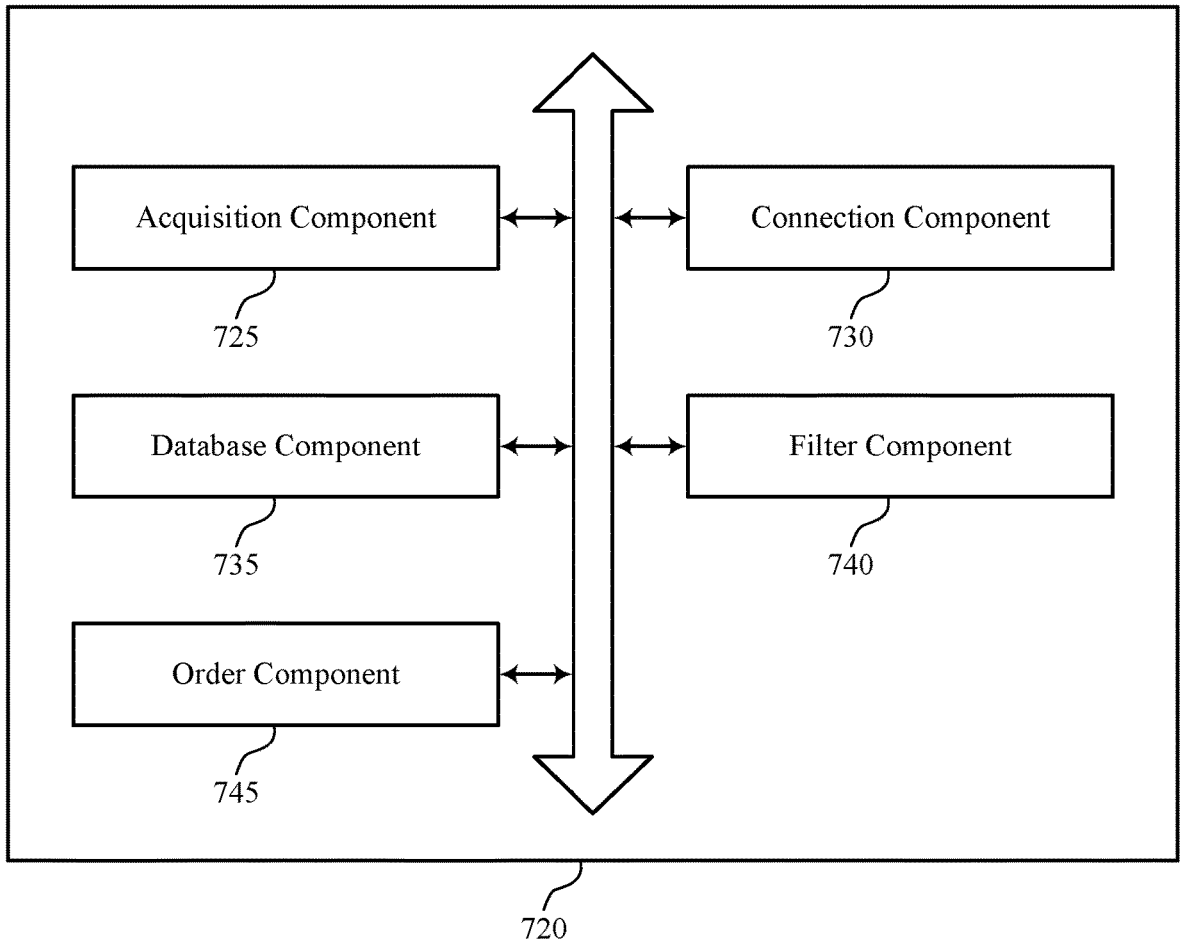
FIG. 7 shows a block diagram of a communications manager that supports techniques for cell acquisition in accordance with aspects of the present disclosure.

FIG. 7 shows a block diagram 700 of a communications manager 720 that supports techniques for cell acquisition in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for cell acquisition as described herein. For example, the communications manager 720 may include an acquisition component 725, a connection component 730, a database component 735, a filter component 740, an order component 745, or any combination thereof. Each of these components may communicate, directly or indirectly, with one another (e.g., via one or more buses).

The communications manager 720 may support wireless communication at a UE in accordance with examples as disclosed herein. The acquisition component 725 may be configured as or otherwise support a means for communicating, with a network entity, acquisition signaling associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed. The connection component 730 may be configured as or otherwise support a means for establishing the connection with the network entity via the first cell based on an identifier associated with the first cell, the identifier indicating that the first cell is configured to support the communications between the UE and the network entity while the UE moves at the first speed.

In some examples, to support communicating the acquisition signaling, the acquisition component 725 may be configured as or otherwise support a means for transmitting, to the network entity and based on the UE storing the identifier associated with the first cell at the UE in a database used to track which frequencies are associated with cells that are configured to support the communications between the UE and the network entity while the UE moves at the first speed, a first acquisition message requesting for the network entity to indicate whether the first cell is available for establishing the connection with the network entity. In some examples, to support communicating the acquisition signaling, the acquisition component 725 may be configured as or otherwise support a means for receiving, from the network entity in response to the first acquisition message, a second acquisition message indicating that the first cell is available.

In some examples, to support establishing the connection with the network entity, the connection component 730 may be configured as or otherwise support a means for transmitting, to the network entity and using the first frequency, a request for the network entity to transmit a SIB corresponding to the first cell in response to receiving the second acquisition message. In some examples, to support establishing the connection with the network entity, the connection component 730 may be configured as or otherwise support a means for receiving, from the network entity in response to the request, the SIB corresponding to the first cell, where the connection is established with the network entity in accordance with the SIB.

In some examples, to support communicating the acquisition signaling, the acquisition component 725 may be configured as or otherwise support a means for transmitting, to the network entity, a first acquisition message requesting for the network entity to indicate which cells are associated with the first frequency. In some examples, to support communicating the acquisition signaling, the acquisition component 725 may be configured as or otherwise support a means for receiving, from the network entity in response to the first acquisition message, a second acquisition message indicating a set of cells associated with the first frequency, the set of cells including a first subset of cells including the first cell that are configured to support the communications between the UE and the network entity while the UE moves at the first speed (e.g., a first subset of HST cells) and a second subset of cells including the second cell that are configured to support the communications between the UE and the network entity while the UE moves at the second speed (e.g., a second subset of non-HST cells).

In some examples, to support establishing the connection with the network entity, the connection component 730 may be configured as or otherwise support a means for transmitting, to the network entity and using the first frequency, a request for the network entity to transmit a SIB corresponding to the first cell based on the first cell being included in the first subset of cells. In some examples, to support establishing the connection with the network entity, the connection component 730 may be configured as or otherwise support a means for receiving, from the network entity in response to the request, the SIB corresponding to the first cell, where the connection is established with the network entity in accordance with the SIB.

In some examples, the filter component 740 may be configured as or otherwise support a means for filtering the set of cells to remove the second subset of cells from the set of cells. In some examples, the order component 745 may be configured as or otherwise support a means for ordering the first subset of cells from a cell associated with a greatest signal strength to a cell associated with a lowest signal strength relative to other signal strengths associated with remaining cells of the first subset of cells, where the connection is established with the network entity via the first cell in accordance with an order of the first subset of cells.

In some examples, the first cell is associated with the greatest signal strength. In some examples, the connection is established with the network entity via the first cell based on the first cell being associated with the greatest signal strength.

In some examples, the first cell is associated with a first signal strength that is less than a second signal strength associated with a third cell of the first subset of cells. In some examples, the connection is established with the network entity via the first cell based on failing to establish the connection with the network entity via the third cell.

In some examples, the first cell is associated with a first signal strength that is less than a second signal strength associated with the second cell, and the connection component 730 may be configured as or otherwise support a means for refraining from establishing the connection with the network entity via the second cell based on the identifier indicating that the first cell is configured to support the communications between the UE and the network entity while the UE moves at the first speed.

In some examples, the database component 735 may be configured as or otherwise support a means for selecting the first cell to use to establish the connection with the network entity from a database stored at the UE and used to track which frequencies are associated with cells that are configured to support the communications between the UE and the network entity while the UE moves at the first speed, the database storing the first frequency and the identifier associated with the first cell.

In some examples, the acquisition signaling indicates the identifier associated with the first cell to the UE.

In some examples, the database component 735 may be configured as or otherwise support a means for storing the identifier associated with the first cell at the UE in a database used to track which frequencies are associated with cells that are configured to support the communications between the UE and the network entity while the UE moves at the first speed.

In some examples, communicating the acquisition signaling and establishing the connection with the network entity via the first cell are based on one or more of a location of the UE relative to the first cell or a direction of travel of the UE relative to the first cell.

In some examples, the first cell is an HST cell and the second cell is a non-HST cell.

Figure 8:
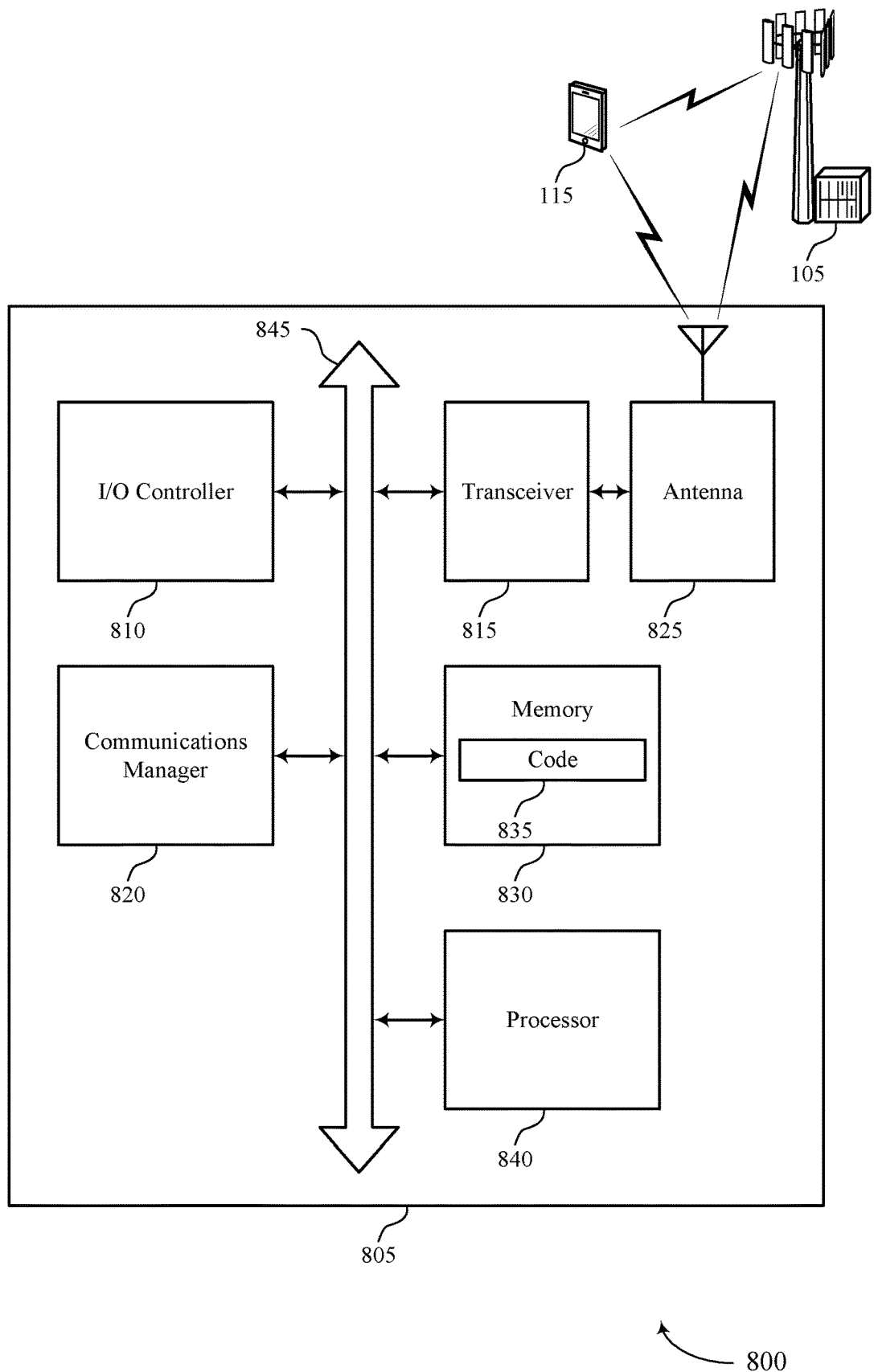
FIG. 8 shows a diagram of a system including a device that supports techniques for cell acquisition in accordance with aspects of the present disclosure.

FIG. 8 shows a diagram of a system 800 including a device 805 that supports techniques for cell acquisition in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for cell acquisition). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for communicating, with a network entity, acquisition signaling associated with establishing a connection with the network entity using a first frequency, the first frequency associated with a first cell configured to support communications between the UE and the network entity while the UE moves at a first speed that satisfies a threshold (e.g., an HST cell) and a second cell configured to support communications between the UE and the network entity while the UE moves at a second speed that is less than the first speed (e.g., a non-HST cell). The communications manager 820 may be configured as or otherwise support a means for establishing the connection with the network entity via the first cell based on an identifier associated with the first cell, the identifier indicating that the first cell is configured to support the communications between the UE and the network entity while the UE moves at the first speed.

By including or configuring the communications manager 820 in accordance with examples as described herein, the device 805 may support techniques for reduced latency, reduced power consumption, more efficient utilization of communication resources, improved communication reliability, improved user experience related to reduced processing and reduced service interruption times, improved coordination between devices, longer battery life, and improved utilization of processing capability, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for cell acquisition as described herein, or the processor 840 and the memory 830 may be otherwise configured to perform or support such operations.

Figure 9:
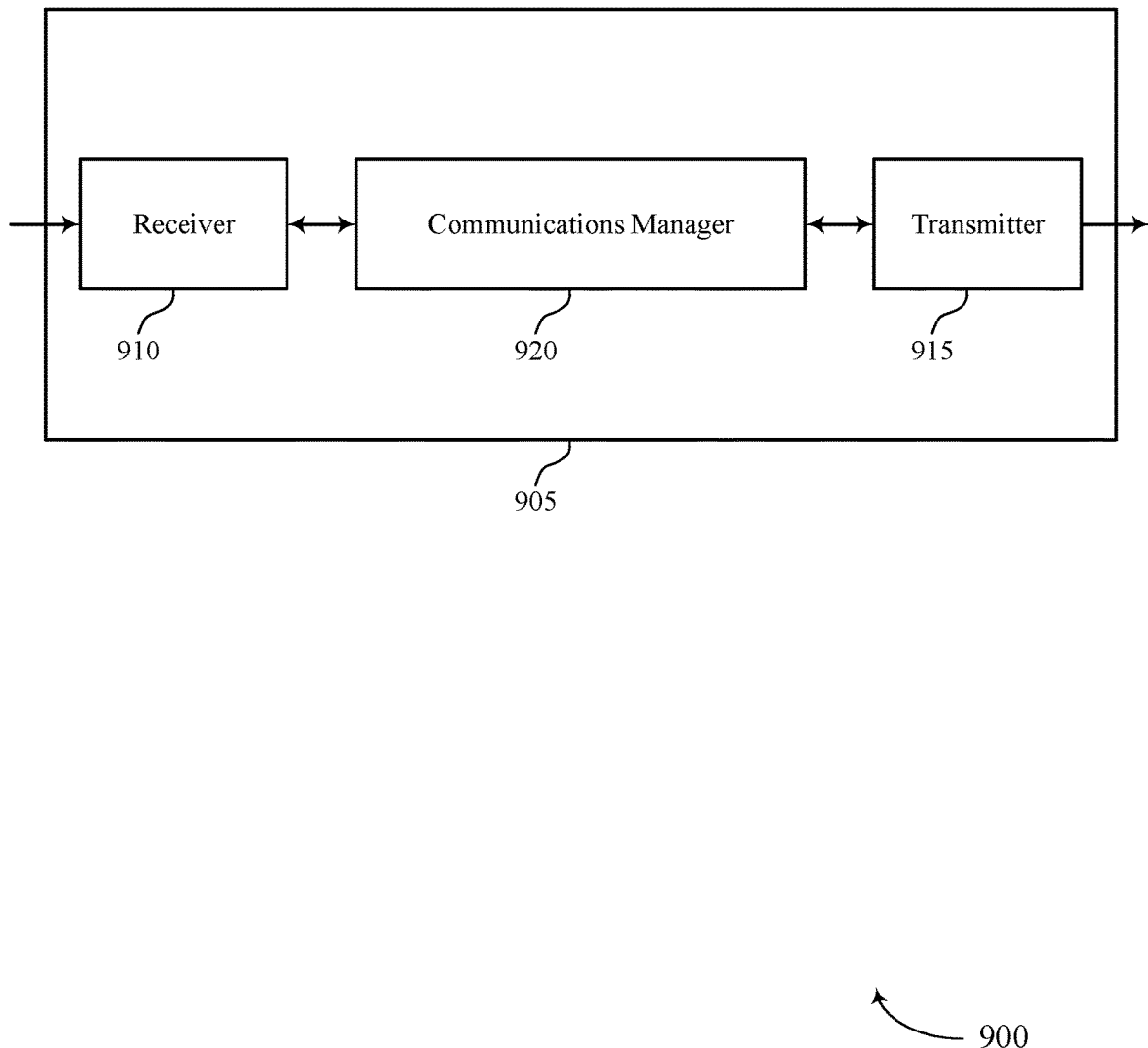
FIGS. 9 and 10 show block diagrams of devices that support techniques for cell acquisition in accordance with aspects of the present disclosure.

FIG. 9 shows a block diagram 900 of a device 905 that supports techniques for cell acquisition in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for cell acquisition). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for cell acquisition). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for cell acquisition as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network entity in accordance with examples as disclosed herein. For example, the communications manager 920 may be configured as or otherwise support a means for communicating, with a UE, acquisition signaling associated with establishing a connection with the UE using a first frequency, the first frequency associated with a first cell configured to support communications between the UE and the network entity while the UE moves at a first speed that satisfies a threshold (e.g., an HST cell) and a second cell configured to support communications between the UE and the network entity while the UE moves at a second speed that is less than the first speed (e.g., a non-HST cell). The communications manager 920 may be configured as or otherwise support a means for establishing the connection with the UE via the first cell based on an identifier associated with the first cell indicating that the first cell is configured to support the communications between the UE and the network entity while the UE moves at the first speed.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources, for example, by supporting the prioritization of camping on HST cells during cell acquisition.

Figure 10:
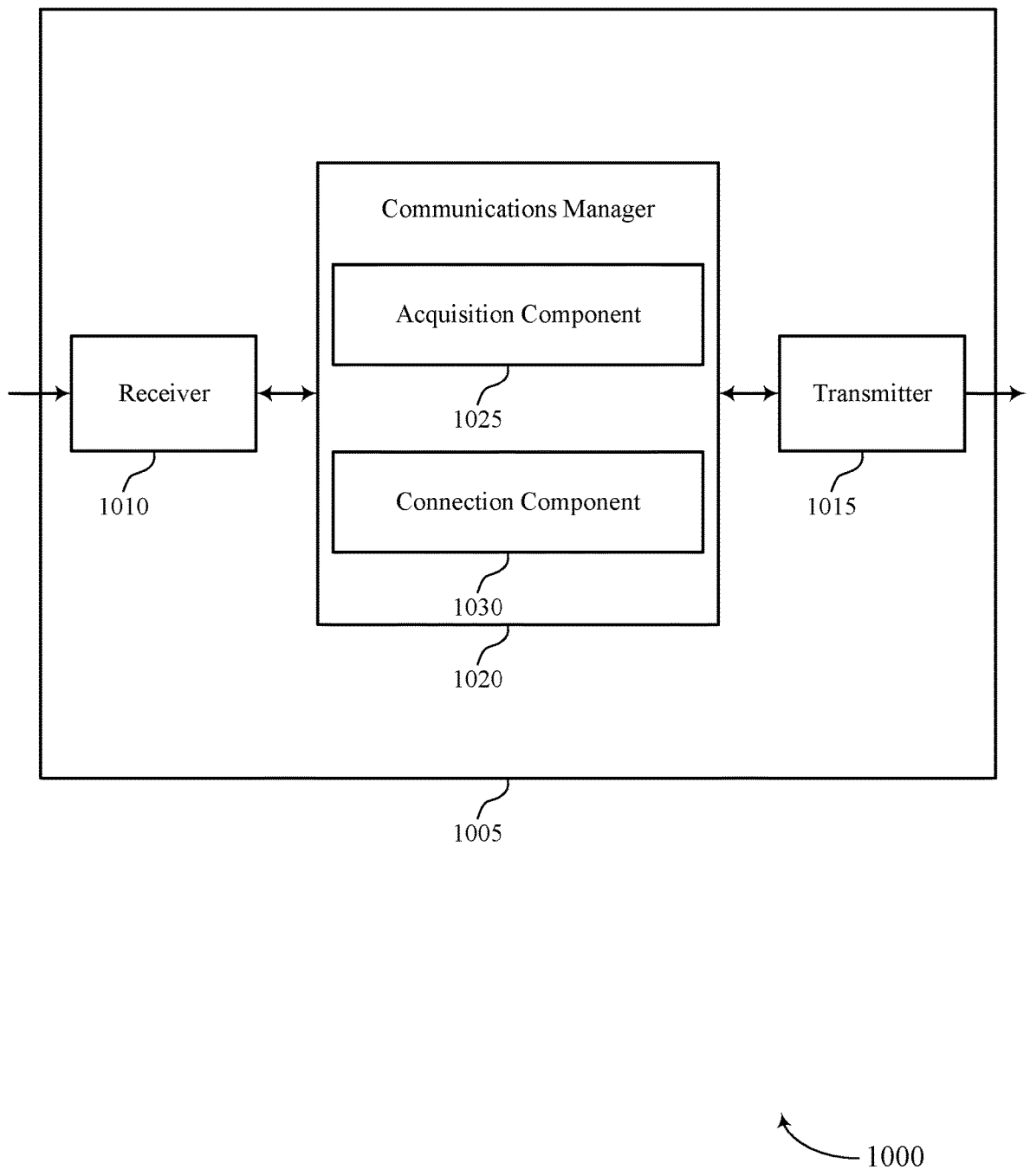

FIG. 10 shows a block diagram 1000 of a device 1005 that supports techniques for cell acquisition in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for cell acquisition). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for cell acquisition). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for cell acquisition as described herein. For example, the communications manager 1020 may include an acquisition component 1025 a connection component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. The acquisition component 1025 may be configured as or otherwise support a means for communicating, with a UE, acquisition signaling associated with establishing a connection with the UE using a first frequency, the first frequency associated with a first cell configured to support communications between the UE and the network entity while the UE moves at a first speed that satisfies a threshold (e.g., an HST cell) and a second cell configured to support communications between the UE and the network entity while the UE moves at a second speed that is less than the first speed (e.g., a non-HST cell). The connection component 1030 may be configured as or otherwise support a means for establishing the connection with the UE via the first cell based on an identifier associated with the first cell indicating that the first cell is configured to support the communications between the UE and the network entity while the UE moves at the first speed.

Figure 11:
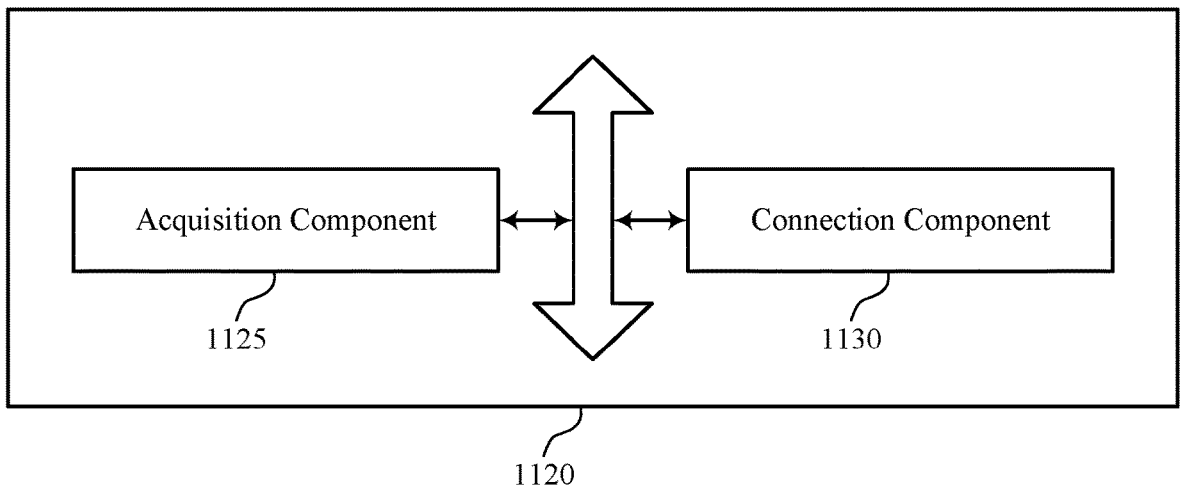
FIG. 11 shows a block diagram of a communications manager that supports techniques for cell acquisition in accordance with aspects of the present disclosure.

FIG. 11 shows a block diagram 1100 of a communications manager 1120 that supports techniques for cell acquisition in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for cell acquisition as described herein. For example, the communications manager 1120 may include an acquisition component 1125 a connection component 1130, or any combination thereof. Each of these components may communicate, directly or indirectly, with one another (e.g., via one or more buses).

The communications manager 1120 may support wireless communication at a network entity in accordance with examples as disclosed herein. The acquisition component 1125 may be configured as or otherwise support a means for communicating, with a UE, acquisition signaling associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed. The connection component 1130 may be configured as or otherwise support a means for establishing the connection with the UE via the first cell based on an identifier associated with the first cell indicating that the first cell is configured to support the communications between the UE and the network entity while the UE moves at the first speed.

In some examples, to support communicating the acquisition signaling, the acquisition component 1125 may be configured as or otherwise support a means for receiving, from the UE, a first acquisition message requesting for the network entity to indicate whether the first cell is available for establishing the connection with the network entity. In some examples, to support communicating the acquisition signaling, the acquisition component 1125 may be configured as or otherwise support a means for transmitting, to the UE in response to the first acquisition message, a second acquisition message indicating that the first cell is available.

In some examples, to support establishing the connection with the network entity, the connection component 1130 may be configured as or otherwise support a means for receiving, from the UE and using the first frequency, a request for the network entity to transmit a SIB corresponding to the first cell in response to transmitting the second acquisition message. In some examples, to support establishing the connection with the network entity, the connection component 1130 may be configured as or otherwise support a means for transmitting, to the UE in response to the request, the SIB corresponding to the first cell, where the connection is established with the UE in accordance with the SIB.

In some examples, to support communicating the acquisition signaling, the acquisition component 1125 may be configured as or otherwise support a means for receiving, from the UE, a first acquisition message requesting for the network entity to indicate which cells are associated with the first frequency. In some examples, to support communicating the acquisition signaling, the acquisition component 1125 may be configured as or otherwise support a means for transmitting, to the UE in response to the first acquisition message, a second acquisition message indicating a set of cells associated with the first frequency, the set of cells including a first subset of cells including the first cell that are configured to support the communications between the UE and the network entity while the UE moves at the first speed (e.g., a first subset of HST cells) and a second subset of cells including the second cell that are configured to support the communications between the UE and the network entity while the UE moves at the second speed (e.g., a second subset of non-HST cells).

In some examples, to support establishing the connection with the network entity, the connection component 1130 may be configured as or otherwise support a means for receiving, from the UE and using the first frequency, a request for the network entity to transmit a SIB corresponding to the first cell based on the first cell being included in the first subset of cells. In some examples, to support establishing the connection with the network entity, the connection component 1130 may be configured as or otherwise support a means for transmitting, to the UE in response to the request, the SIB corresponding to the first cell, where the connection is established with the UE in accordance with the SIB.

In some examples, the first cell is associated with a greatest signal strength relative to other signal strengths associated with remaining cells of the first subset of cells. In some examples, the connection is established with the UE via the first cell based on the first cell being associated with the greatest signal strength.

In some examples, the first cell is associated with a first signal strength that is less than a second signal strength associated with a third cell of the first subset of cells. In some examples, the connection is established with the UE via the first cell based on failing to establish the connection with the UE via the third cell.

In some examples, the first cell is associated with a first signal strength that is less than a second signal strength associated with the second cell, and the connection component 1130 may be configured as or otherwise support a means for refraining from establishing the connection with the UE via the second cell based on the identifier indicating that the first cell is configured to support the communications between the UE and the network entity while the UE moves at the first speed.

In some examples, the acquisition signaling indicates the identifier associated with the first cell to the UE.

In some examples, communicating the acquisition signaling and establishing the connection with the UE via the first cell are based on one or more of a location of the UE relative to the first cell or a direction of travel of the UE relative to the first cell.

In some examples, the first cell is an HST cell and the second cell is a non-HST cell.

Figure 12:
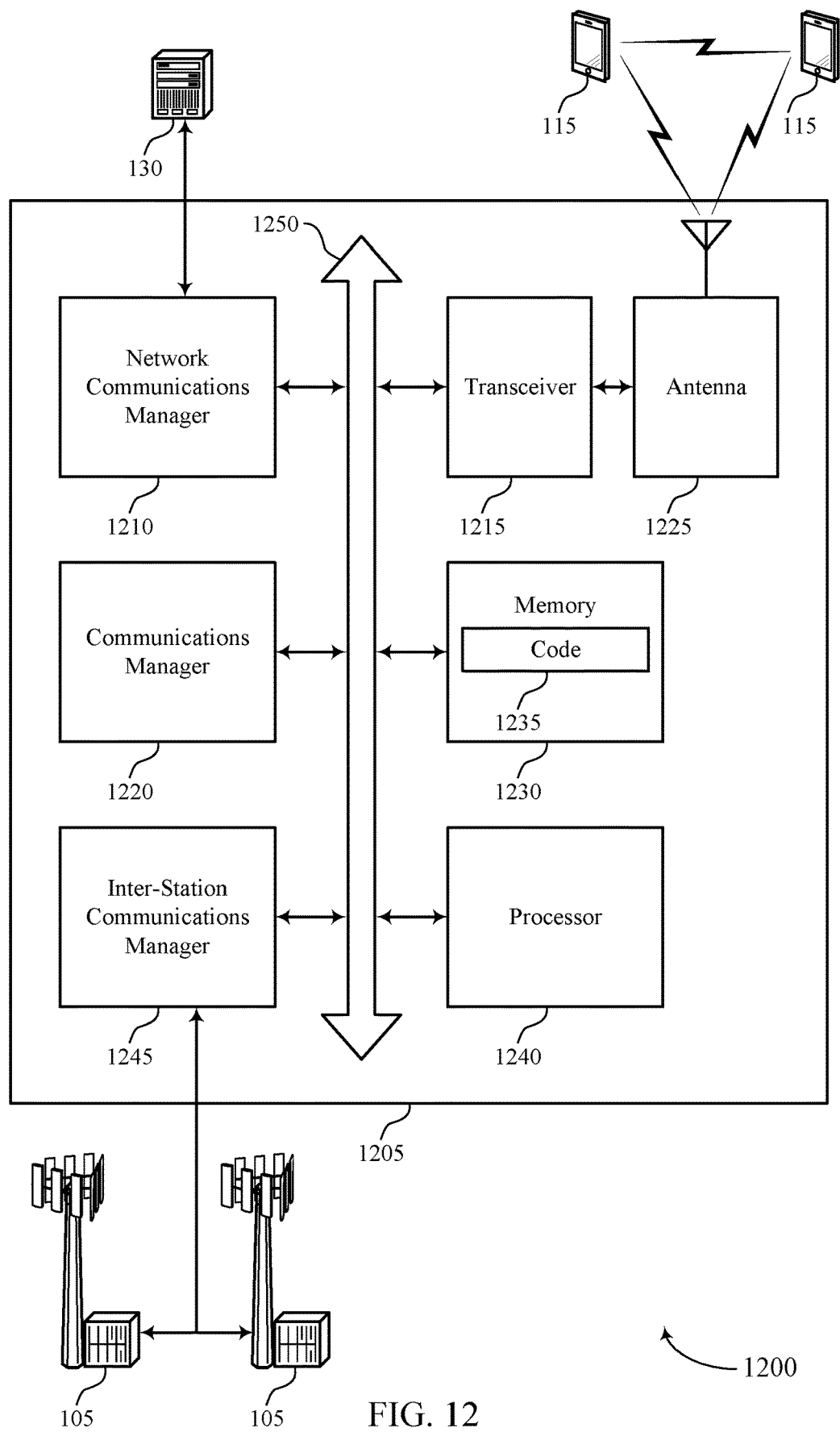
FIG. 12 shows a diagram of a system including a device that supports techniques for cell acquisition in accordance with aspects of the present disclosure.

FIG. 12 shows a diagram of a system 1200 including a device 1205 that supports techniques for cell acquisition in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for cell acquisition). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a network entity in accordance with examples as disclosed herein. For example, the communications manager 1220 may be configured as or otherwise support a means for communicating, with a UE, acquisition signaling associated with establishing a connection with the UE using a first frequency, the first frequency associated with a first cell configured to support communications between the UE and the network entity while the UE moves at a first speed that satisfies a threshold (e.g., an HST cell) and a second cell configured to support communications between the UE and the network entity while the UE moves at a second speed that is less than the first speed (e.g., a non-HST cell). The communications manager 1220 may be configured as or otherwise support a means for establishing the connection with the UE via the first cell based on an identifier associated with the first cell indicating that the first cell is configured to support the communications between the UE and the network entity while the UE moves at the first speed.

By including or configuring the communications manager 1220 in accordance with examples as described herein, the device 1205 may support techniques for reduced latency, reduced power consumption, more efficient utilization of communication resources, improved communication reliability, improved user experience related to reduced processing and reduced service interruption times, improved coordination between devices, longer battery life, and improved utilization of processing capability, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for cell acquisition as described herein, or the processor 1240 and the memory 1230 may be otherwise configured to perform or support such operations.

Figure 13:
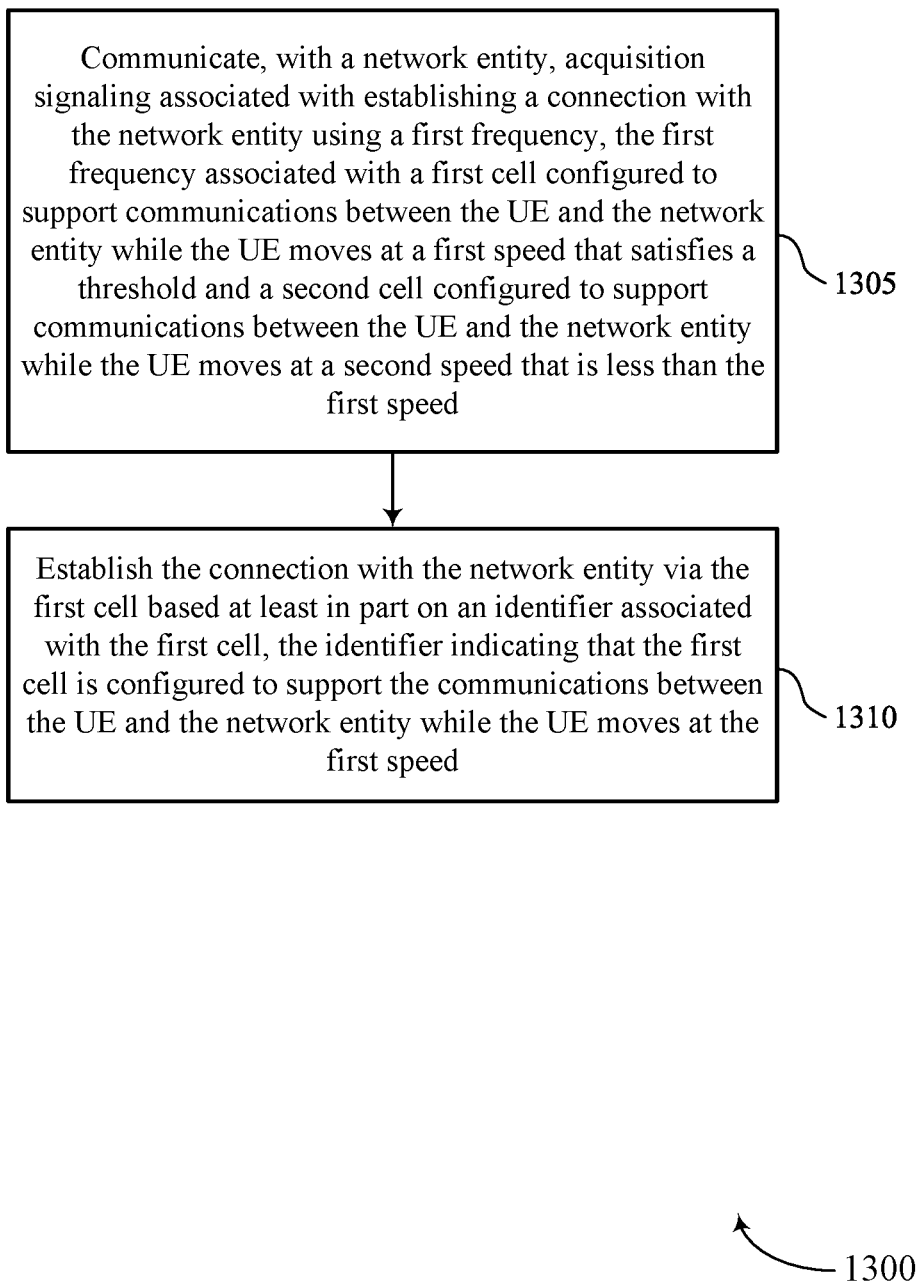
FIGS. 13 through 18 show flowcharts illustrating methods that support techniques for cell acquisition in accordance with aspects of the present disclosure.

FIG. 13 shows a flowchart illustrating a method 1300 that supports techniques for cell acquisition in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include communicating, with a network entity, acquisition signaling associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed. The operations of 1305 may be performed in accordance with examples as disclosed herein. In some examples, aspects of the operations of 1305 may be performed by an acquisition component 725 as described with reference to FIG. 7.

At 1310, the method may include establishing the connection with the network entity via the first cell based on an identifier associated with the first cell, the identifier indicating that the first cell is configured to support the communications between the UE and the network entity while the UE moves at the first speed. The operations of 1310 may be performed in accordance with examples as disclosed herein. In some examples, aspects of the operations of 1310 may be performed by a connection component 730 as described with reference to FIG. 7.

Figure 14:
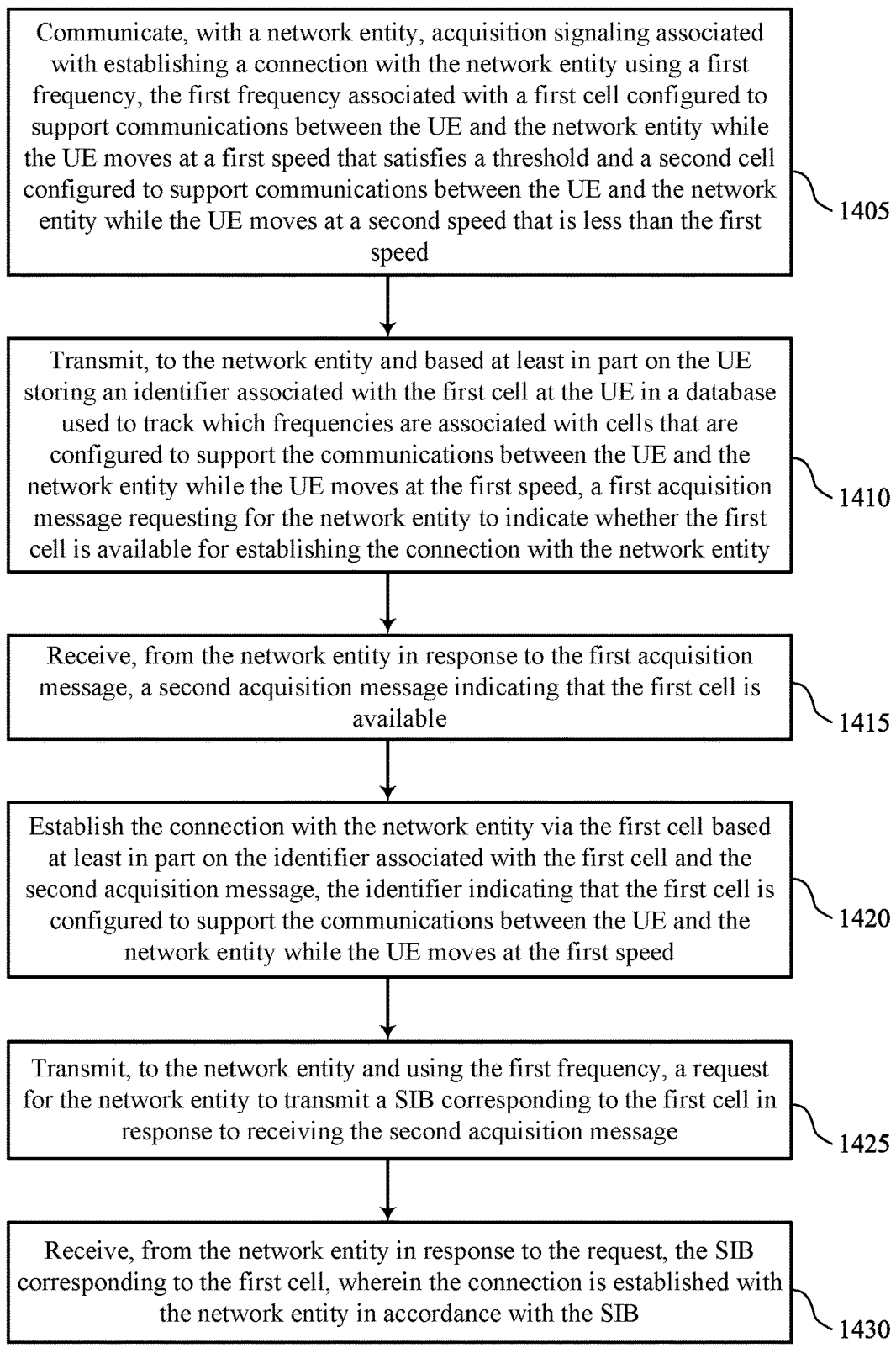

FIG. 14 shows a flowchart illustrating a method 1400 that supports techniques for cell acquisition in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include communicating, with a network entity, acquisition signaling associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed. The operations of 1405 may be performed in accordance with examples as disclosed herein. In some examples, aspects of the operations of 1405 may be performed by an acquisition component 725 as described with reference to FIG. 7.

At 1410, to communicate the acquisition signaling, the method may include transmitting, to the network entity and based on the UE storing an identifier associated with the first cell at the UE in a database used to track which frequencies are associated with cells that are configured to support the communications between the UE and the network entity while the UE moves at the first speed, a first acquisition message requesting for the network entity to indicate whether the first cell is available for establishing the connection with the network entity. The operations of 1410 may be performed in accordance with examples as disclosed herein. In some examples, aspects of the operations of 1410 may be performed by an acquisition component 725 as described with reference to FIG. 7.

At 1415, to communicate the acquisition signaling, the method may include receiving, from the network entity in response to the first acquisition message, a second acquisition message indicating that the first cell is available. The operations of 1415 may be performed in accordance with examples as disclosed herein. In some examples, aspects of the operations of 1415 may be performed by an acquisition component 725 as described with reference to FIG. 7.

At 1420, the method may include establishing the connection with the network entity via the first cell based on the identifier associated with the first cell, the identifier indicating that the first cell is configured to support the communications between the UE and the network entity while the UE moves at the first speed. The operations of 1420 may be performed in accordance with examples as disclosed herein. In some examples, aspects of the operations of 1420 may be performed by a connection component 730 as described with reference to FIG. 7.

At 1425, to establish the connection with the network entity, the method may include transmitting, to the network entity and using the first frequency, a request for the network entity to transmit a SIB corresponding to the first cell in response to receiving the second acquisition message. The operations of 1425 may be performed in accordance with examples as disclosed herein. In some examples, aspects of the operations of 1425 may be performed by a connection component 730 as described with reference to FIG. 7.

At 1430, to establish the connection with the network entity, the method may include receiving, from the network entity in response to the request, the SIB corresponding to the first cell, where the connection is established with the network entity in accordance with the SIB. The operations of 1430 may be performed in accordance with examples as disclosed herein. In some examples, aspects of the operations of 1430 may be performed by a connection component 730 as described with reference to FIG. 7.

Figure 15:
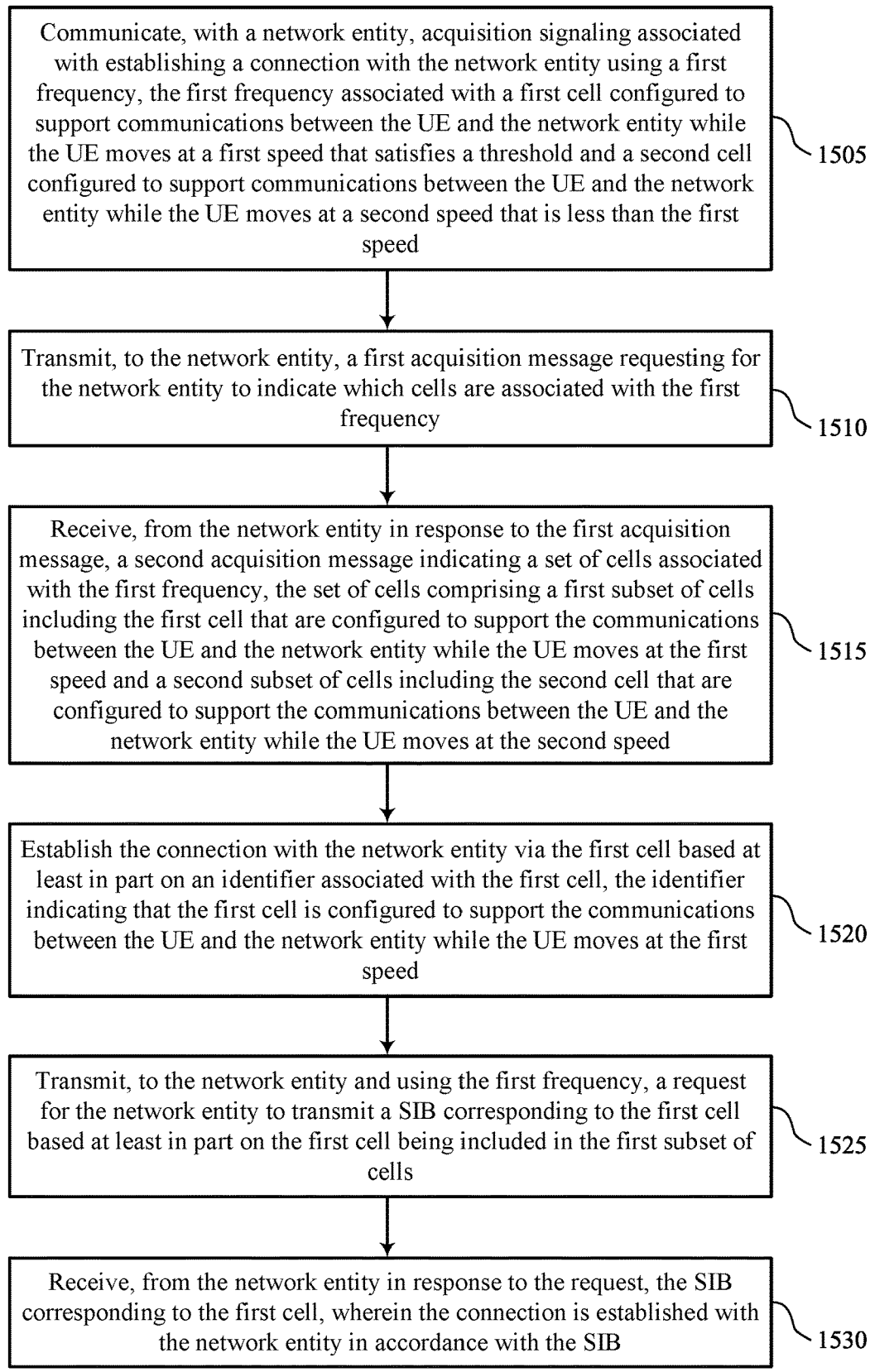

FIG. 15 shows a flowchart illustrating a method 1500 that supports techniques for cell acquisition in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include communicating, with a network entity, acquisition signaling associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed. The operations of 1505 may be performed in accordance with examples as disclosed herein. In some examples, aspects of the operations of 1505 may be performed by an acquisition component 725 as described with reference to FIG. 7.

At 1510, to communicate the acquisition signaling, the method may include transmitting, to the network entity, a first acquisition message requesting for the network entity to indicate which cells are associated with the first frequency. The operations of 1510 may be performed in accordance with examples as disclosed herein. In some examples, aspects of the operations of 1510 may be performed by an acquisition component 725 as described with reference to FIG. 7.

At 1515, to communicate the acquisition signaling, the method may include receiving, from the network entity in response to the first acquisition message, a second acquisition message indicating a set of cells associated with the first frequency, the set of cells including a first subset of cells including the first cell that are configured to support the communications between the UE and the network entity while the UE moves at the first speed and a second subset of cells including the second cell that are configured to support the communications between the UE and the network entity while the UE moves at the second speed. The operations of 1515 may be performed in accordance with examples as disclosed herein. In some examples, aspects of the operations of 1515 may be performed by an acquisition component 725 as described with reference to FIG. 7.

At 1520, the method may include establishing the connection with the network entity via the first cell based on an identifier associated with the first cell, the identifier indicating that the first cell is configured to support the communications between the UE and the network entity while the UE moves at the first speed. The operations of 1520 may be performed in accordance with examples as disclosed herein. In some examples, aspects of the operations of 1520 may be performed by a connection component 730 as described with reference to FIG. 7.

At 1525, to establish the connection with the network entity, the method may include transmitting, to the network entity and using the first frequency, a request for the network entity to transmit a SIB corresponding to the first cell based on the first cell being included in the first subset of cells. The operations of 1525 may be performed in accordance with examples as disclosed herein. In some examples, aspects of the operations of 1525 may be performed by a connection component 730 as described with reference to FIG. 7.

At 1530, to establish the connection with the network entity, the method may include receiving, from the network entity in response to the request, the SIB corresponding to the first cell, where the connection is established with the network entity in accordance with the SIB. The operations of 1530 may be performed in accordance with examples as disclosed herein. In some examples, aspects of the operations of 1530 may be performed by a connection component 730 as described with reference to FIG. 7.

Figure 16:
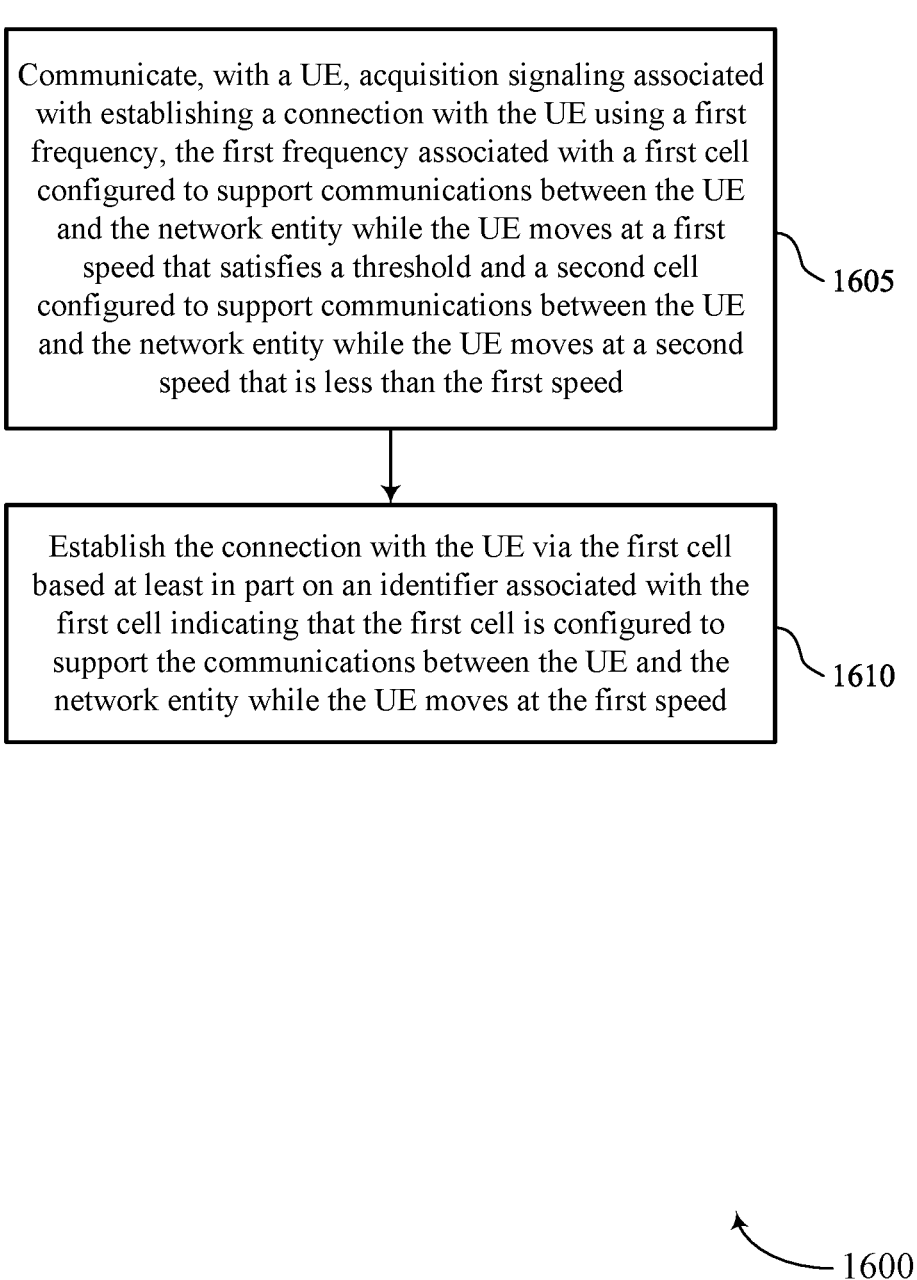

FIG. 16 shows a flowchart illustrating a method 1600 that supports techniques for cell acquisition in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include communicating, with a UE, acquisition signaling associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed. The operations of 1605 may be performed in accordance with examples as disclosed herein. In some examples, aspects of the operations of 1605 may be performed by an acquisition component 1125 as described with reference to FIG. 11.

At 1610, the method may include establishing the connection with the UE via the first cell based on an identifier associated with the first cell indicating that the first cell is configured to support the communications between the UE and the network entity while the UE moves at the first speed. The operations of 1610 may be performed in accordance with examples as disclosed herein. In some examples, aspects of the operations of 1610 may be performed by a connection component 1130 as described with reference to FIG. 11.

Figure 17:
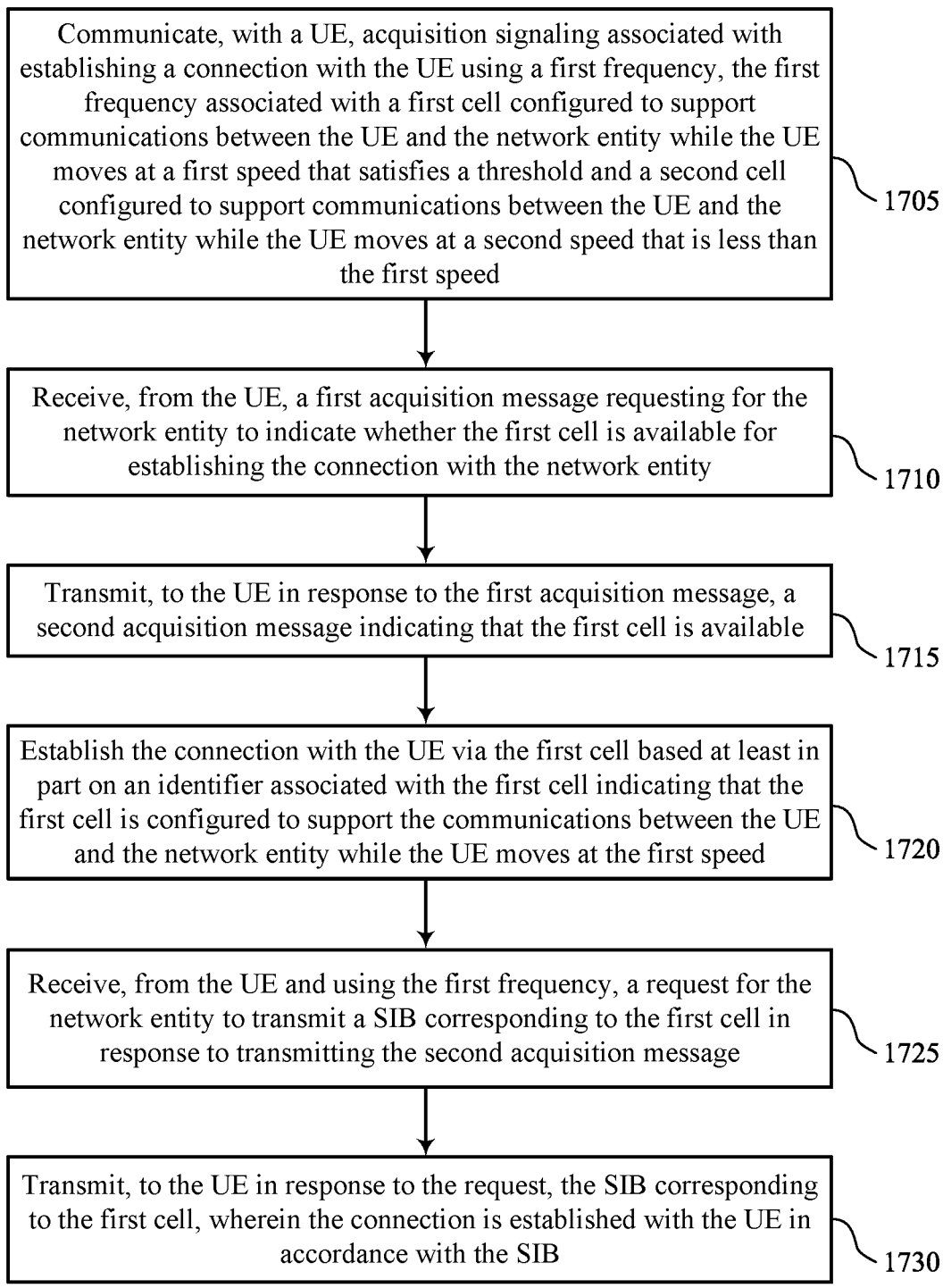

FIG. 17 shows a flowchart illustrating a method 1700 that supports techniques for cell acquisition in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include communicating, with a UE, acquisition signaling associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed. The operations of 1705 may be performed in accordance with examples as disclosed herein. In some examples, aspects of the operations of 1705 may be performed by an acquisition component 1125 as described with reference to FIG. 11.

At 1710, to communicate the acquisition signaling, the method may include receiving, from the UE, a first acquisition message requesting for the network entity to indicate whether the first cell is available for establishing the connection with the network entity. The operations of 1710 may be performed in accordance with examples as disclosed herein. In some examples, aspects of the operations of 1710 may be performed by an acquisition component 1125 as described with reference to FIG. 11.

At 1715, to communicate the acquisition signaling, the method may include transmitting, to the UE in response to the first acquisition message, a second acquisition message indicating that the first cell is available. The operations of 1715 may be performed in accordance with examples as disclosed herein. In some examples, aspects of the operations of 1715 may be performed by an acquisition component 1125 as described with reference to FIG. 11.

At 1720, the method may include establishing the connection with the UE via the first cell based on an identifier associated with the first cell indicating that the first cell is configured to support the communications between the UE and the network entity while the UE moves at the first speed. The operations of 1720 may be performed in accordance with examples as disclosed herein. In some examples, aspects of the operations of 1720 may be performed by a connection component 1130 as described with reference to FIG. 11.

At 1725, to establish the connection with the UE, the method may include receiving, from the UE and using the first frequency, a request for the network entity to transmit a SIB corresponding to the first cell in response to transmitting the second acquisition message. The operations of 1725 may be performed in accordance with examples as disclosed herein. In some examples, aspects of the operations of 1725 may be performed by a connection component 1130 as described with reference to FIG. 11.

At 1730, to establish the connection with the UE, the method may include transmitting, to the UE in response to the request, the SIB corresponding to the first cell, where the connection is established with the UE in accordance with the SIB. The operations of 1730 may be performed in accordance with examples as disclosed herein. In some examples, aspects of the operations of 1730 may be performed by a connection component 1130 as described with reference to FIG. 11.

Figure 18:
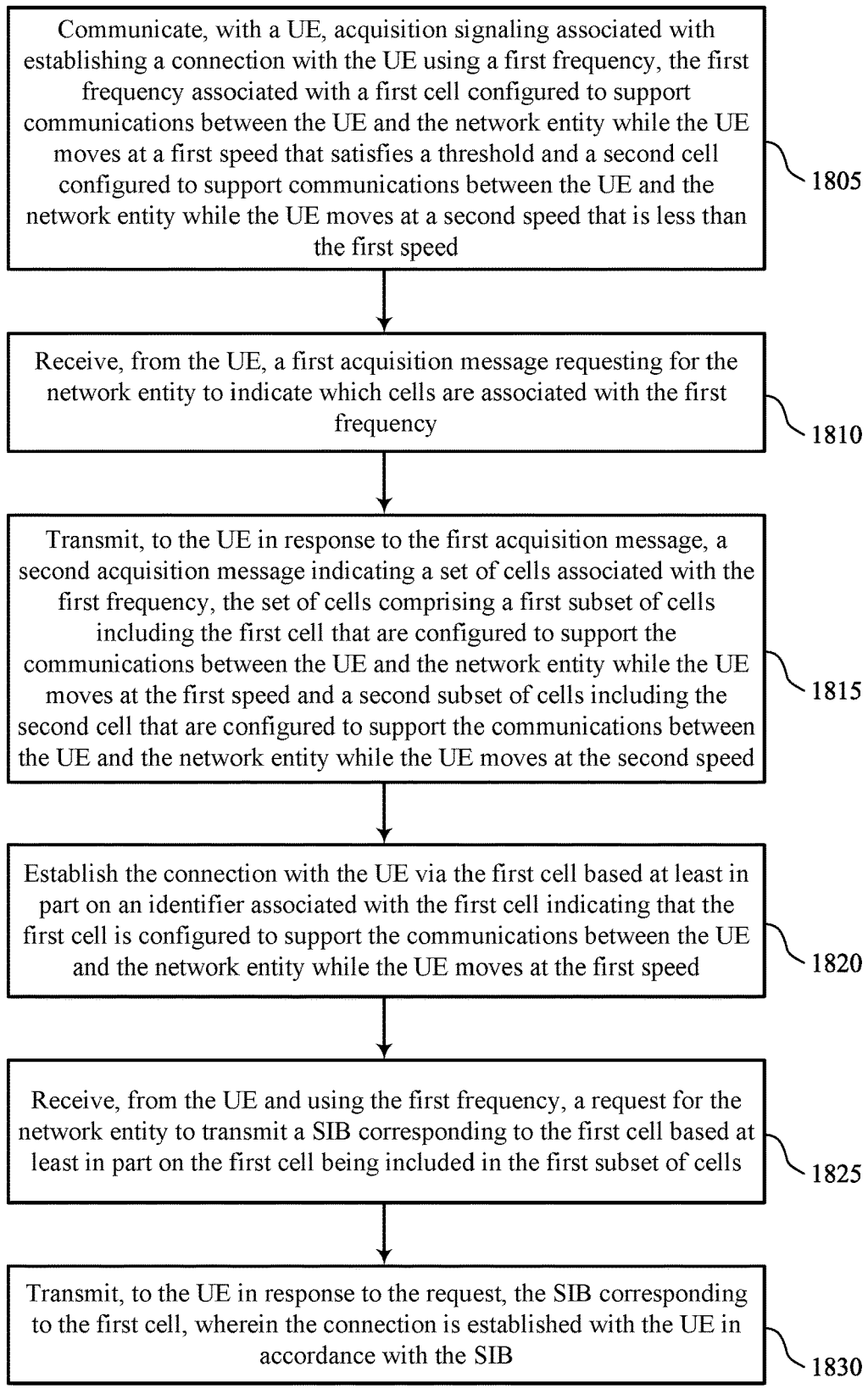

FIG. 18 shows a flowchart illustrating a method 1800 that supports techniques for cell acquisition in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include communicating, with a UE, acquisition signaling associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed. The operations of 1805 may be performed in accordance with examples as disclosed herein. In some examples, aspects of the operations of 1805 may be performed by an acquisition component 1125 as described with reference to FIG. 11.

At 1810, to communicate the acquisition signaling, the method may include receiving, from the UE, a first acquisition message requesting for the network entity to indicate which cells are associated with the first frequency. The operations of 1810 may be performed in accordance with examples as disclosed herein. In some examples, aspects of the operations of 1810 may be performed by an acquisition component 1125 as described with reference to FIG. 11.

At 1815, to communicate the acquisition signaling, the method may include transmitting, to the UE in response to the first acquisition message, a second acquisition message indicating a set of cells associated with the first frequency, the set of cells including a first subset of cells including the first cell that are configured to support the communications between the UE and the network entity while the UE moves at the first speed and a second subset of cells including the second cell that are configured to support the communications between the UE and the network entity while the UE moves at the second speed. The operations of 1815 may be performed in accordance with examples as disclosed herein. In some examples, aspects of the operations of 1815 may be performed by an acquisition component 1125 as described with reference to FIG. 11.

At 1820, the method may include establishing the connection with the UE via the first cell based on an identifier associated with the first cell indicating that the first cell is configured to support the communications between the UE and the network entity while the UE moves at the first speed. The operations of 1820 may be performed in accordance with examples as disclosed herein. In some examples, aspects of the operations of 1820 may be performed by a connection component 1130 as described with reference to FIG. 11.

At 1825, to establish the connection with the UE, the method may include receiving, from the UE and using the first frequency, a request for the network entity to transmit a SIB corresponding to the first cell based on the first cell being included in the first subset of cells. The operations of 1825 may be performed in accordance with examples as disclosed herein. In some examples, aspects of the operations of 1825 may be performed by a connection component 1130 as described with reference to FIG. 11.

At 1830, to establish the connection with the UE, the method may include transmitting, to the UE in response to the request, the SIB corresponding to the first cell, where the connection is established with the UE in accordance with the SIB. The operations of 1830 may be performed in accordance with examples as disclosed herein. In some examples, aspects of the operations of 1830 may be performed by a connection component 1130 as described with reference to FIG. 11.

The following provides an overview of aspects of the present disclosure:

Aspect 1: A method for wireless communication at a UE, comprising: communicating, with a network entity, acquisition signaling associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed; and establishing the connection with the network entity via the first cell based at least in part on an identifier associated with the first cell, the identifier indicating that the first cell is configured to support the communications between the UE and the network entity while the UE moves at the first speed.

Aspect 2: The method of aspect 1, wherein communicating the acquisition signaling comprises: transmitting, to the network entity and based at least in part on the UE storing the identifier associated with the first cell at the UE in a database used to track which frequencies are associated with cells that are configured to support the communications between the UE and the network entity while the UE moves at the first speed, a first acquisition message requesting for the network entity to indicate whether the first cell is available for establishing the connection with the network entity; and receiving, from the network entity in response to the first acquisition message, a second acquisition message indicating that the first cell is available.

Aspect 3: The method of aspect 2, wherein establishing the connection with the network entity comprises: transmitting, to the network entity and using the first frequency, a request for the network entity to transmit a SIB corresponding to the first cell in response to receiving the second acquisition message; and receiving, from the network entity in response to the request, the SIB corresponding to the first cell, wherein the connection is established with the network entity in accordance with the SIB.

Aspect 4: The method of aspect 1, wherein communicating the acquisition signaling comprises: transmitting, to the network entity, a first acquisition message requesting for the network entity to indicate which cells are associated with the first frequency; and receiving, from the network entity in response to the first acquisition message, a second acquisition message indicating a set of cells associated with the first frequency, the set of cells comprising a first subset of cells including the first cell that are configured to support the communications between the UE and the network entity while the UE moves at the first speed and a second subset of cells including the second cell that are configured to support the communications between the UE and the network entity while the UE moves at the second speed.

Aspect 5: The method of aspect 4, wherein establishing the connection with the network entity comprises: transmitting, to the network entity and using the first frequency, a request for the network entity to transmit a SIB corresponding to the first cell based at least in part on the first cell being included in the first subset of cells; and receiving, from the network entity in response to the request, the SIB corresponding to the first cell, wherein the connection is established with the network entity in accordance with the SIB.

Aspect 6: The method of any of aspects 4 through 5, further comprising: filtering the set of cells to remove the second subset of cells from the set of cells; and ordering the first subset of cells from a cell associated with a greatest signal strength to a cell associated with a lowest signal strength relative to other signal strengths associated with remaining cells of the first subset of cells, wherein the connection is established with the network entity via the first cell in accordance with an order of the first subset of cells.

Aspect 7: The method of aspect 6, wherein the first cell is associated with the greatest signal strength, and the connection is established with the network entity via the first cell based at least in part on the first cell being associated with the greatest signal strength.

Aspect 8: The method of aspect 6, wherein the first cell is associated with a first signal strength that is less than a second signal strength associated with a third cell of the first subset of cells, and the connection is established with the network entity via the first cell based at least in part on failing to establish the connection with the network entity via the third cell.

Aspect 9: The method of any of aspects 1 through 8, wherein the first cell is associated with a first signal strength that is less than a second signal strength associated with the second cell, the method further comprising: refraining from establishing the connection with the network entity via the second cell based at least in part on the identifier indicating that the first cell is configured to support the communications between the UE and the network entity while the UE moves at the first speed.

Aspect 10: The method of any of aspects 1 through 9, further comprising: selecting the first cell to use to establish the connection with the network entity from a database stored at the UE and used to track which frequencies are associated with cells that are configured to support the communications between the UE and the network entity while the UE moves at the first speed, the database storing the first frequency and the identifier associated with the first cell.

Aspect 11: The method of any of aspects 1 through 10, wherein the acquisition signaling indicates the identifier associated with the first cell to the UE.

Aspect 12: The method of any of aspects 1 through 11, further comprising: storing the identifier associated with the first cell at the UE in a database used to track which frequencies are associated with cells that are configured to support the communications between the UE and the network entity while the UE moves at the first speed.

Aspect 13: The method of any of aspects 1 through 12, wherein communicating the acquisition signaling and establishing the connection with the network entity via the first cell are based at least in part on one or more of a location of the UE relative to the first cell or a direction of travel of the UE relative to the first cell.

Aspect 14: The method of any of aspects 1 through 13, wherein the first cell is an HST cell and the second cell is a non-HST cell.

Aspect 15: A method for wireless communication at a network entity, comprising: communicating, with a UE, acquisition signaling associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed; and establishing the connection with the UE via the first cell based at least in part on an identifier associated with the first cell indicating that the first cell is configured to support the communications between the UE and the network entity while the UE moves at the first speed.

Aspect 16: The method of aspect 15, wherein communicating the acquisition signaling comprises: receiving, from the UE, a first acquisition message requesting for the network entity to indicate whether the first cell is available for establishing the connection with the network entity; and transmitting, to the UE in response to the first acquisition message, a second acquisition message indicating that the first cell is available.

Aspect 17: The method of aspect 16, wherein establishing the connection with the network entity comprises: receiving, from the UE and using the first frequency, a request for the network entity to transmit a SIB corresponding to the first cell in response to transmitting the second acquisition message; and transmitting, to the UE in response to the request, the SIB corresponding to the first cell, wherein the connection is established with the UE in accordance with the SIB.

Aspect 18: The method of aspect 15, wherein communicating the acquisition signaling comprises: receiving, from the UE, a first acquisition message requesting for the network entity to indicate which cells are associated with the first frequency; and transmitting, to the UE in response to the first acquisition message, a second acquisition message indicating a set of cells associated with the first frequency, the set of cells comprising a first subset of cells including the first cell that are configured to support the communications between the UE and the network entity while the UE moves at the first speed and a second subset of cells including the second cell that are configured to support the communications between the UE and the network entity while the UE moves at the second speed.

Aspect 19: The method of aspect 18, wherein establishing the connection with the network entity comprises: receiving, from the UE and using the first frequency, a request for the network entity to transmit a SIB corresponding to the first cell based at least in part on the first cell being included in the first subset of cells; and transmitting, to the UE in response to the request, the SIB corresponding to the first cell, wherein the connection is established with the UE in accordance with the SIB.

Aspect 20: The method of any of aspects 18 through 19, wherein the first cell is associated with a greatest signal strength relative to other signal strengths associated with remaining cells of the first subset of cells, and the connection is established with the UE via the first cell based at least in part on the first cell being associated with the greatest signal strength.

Aspect 21: The method of any of aspects 18 through 19, wherein the first cell is associated with a first signal strength that is less than a second signal strength associated with a third cell of the first subset of cells, and the connection is established with the UE via the first cell based at least in part on failing to establish the connection with the UE via the third cell.

Aspect 22: The method of any of aspects 15 through 21, wherein the first cell is associated with a first signal strength that is less than a second signal strength associated with the second cell, the method further comprising: refraining from establishing the connection with the UE via the second cell based at least in part on the identifier indicating that the first cell is configured to support the communications between the UE and the network entity while the UE moves at the first speed.

Aspect 23: The method of any of aspects 15 through 22, wherein the acquisition signaling indicates the identifier associated with the first cell to the UE.

Aspect 24: The method of any of aspects 15 through 23, wherein communicating the acquisition signaling and establishing the connection with the UE via the first cell are based at least in part on one or more of a location of the UE relative to the first cell or a direction of travel of the UE relative to the first cell.

Aspect 25: The method of any of aspects 15 through 24, wherein the first cell is an HST cell and the second cell is a non-HST cell.

Aspect 26: An apparatus for wireless communication at a UE, comprising a processor; memory coupled with the processor; and instructions stored in the memory and executable by the processor to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication at a network entity, comprising a processor; memory coupled with the processor; and instructions stored in the memory and executable by the processor to cause the apparatus to perform a method of any of aspects 15 through 25.

Aspect 30: An apparatus for wireless communication at a network entity, comprising at least one means for performing a method of any of aspects 15 through 25.

Aspect 31: A non-transitory computer-readable medium storing code for wireless communication at a network entity, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a network entity, a first acquisition message associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed, wherein the first acquisition message requests for the network entity to indicate whether the first cell is available for establishing the connection with the network entity, and wherein the first acquisition message is transmitted based at least in part on the UE storing information associated with the first cell at the UE in a database used to track which frequencies are associated with cells that are configured to support the communications between the UE and the network entity while the UE moves at the first speed;
    receiving, from the network entity in response to the first acquisition message, a second acquisition message indicating that the first cell is available; and
    establishing the connection with the network entity via the first cell based at least in part on the stored information within the UE associated with the first cell, the stored information indicating that the first cell is configured to support the communications between the UE and the network entity while the UE moves at the first speed.

2. The method of claim 1, wherein establishing the connection with the network entity comprises:
    transmitting, to the network entity and using the first frequency, a request for the network entity to transmit a system information block corresponding to the first cell in response to receiving the second acquisition message; and
    receiving, from the network entity in response to the request, the system information block corresponding to the first cell, wherein the connection is established with the network entity in accordance with the system information block.

3. The method of claim 1, wherein the first cell is associated with a first signal strength that is less than a second signal strength associated with the second cell, the method further comprising:
    refraining from establishing the connection with the network entity via the second cell based at least in part on the stored information indicating that the first cell is configured to support the communications between the UE and the network entity while the UE moves at the first speed.

4. The method of claim 1, further comprising:
    selecting the first cell to use to establish the connection with the network entity from the database, the database storing the first frequency and the information associated with the first cell.

5. A method for wireless communication at a user equipment (UE), comprising:
    transmitting, to a network entity, a first acquisition message associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed, wherein the first acquisition message requests for the network entity to indicate which cells are associated with the first frequency;
    receiving, from the network entity in response to the first acquisition message, a second acquisition message indicating a set of cells associated with the first frequency, the set of cells comprising a first subset of cells including the first cell that are configured to support the communications between the UE and the network entity while the UE moves at the first speed and a second subset of cells including the second cell that are configured to support the communications between the UE and the network entity while the UE moves at the second speed; and
    establishing the connection with the network entity via the first cell based at least in part on stored information within the UE associated with the first cell, the stored information indicating that the first cell is configured to support the communications between the UE and the network entity while the UE moves at the first speed.

6. The method of claim 5, wherein establishing the connection with the network entity comprises:
    transmitting, to the network entity and using the first frequency, a request for the network entity to transmit a system information block corresponding to the first cell based at least in part on the first cell being included in the first subset of cells; and
    receiving, from the network entity in response to the request, the system information block corresponding to the first cell, wherein the connection is established with the network entity in accordance with the system information block.

7. The method of claim 5, further comprising:
    filtering the set of cells to remove the second subset of cells from the set of cells; and
    ordering the first subset of cells from a cell associated with a greatest signal strength to a cell associated with a lowest signal strength relative to other signal strengths associated with remaining cells of the first subset of cells, wherein the connection is established with the network entity via the first cell in accordance with an order of the first subset of cells.

8. The method of claim 7, wherein the first cell is associated with the greatest signal strength, and wherein the connection is established with the network entity via the first cell based at least in part on the first cell being associated with the greatest signal strength.

9. The method of claim 7, wherein the first cell is associated with a first signal strength that is less than a second signal strength associated with a third cell of the first subset of cells, and wherein the connection is established with the network entity via the first cell based at least in part on failing to establish the connection with the network entity via the third cell.

10. The method of claim 5, wherein the second acquisition message indicates the information associated with the first cell to the UE.

11. The method of claim 5, further comprising:
storing the information associated with the first cell at the UE in a database used to track which frequencies are associated with cells that are configured to support the communications between the UE and the network entity while the UE moves at the first speed.

12. A method for wireless communication at a network entity, comprising:
receiving, from a user equipment (UE), a first acquisition message associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed, wherein the first acquisition message requests for the network entity to indicate whether the first cell is available for establishing the connection with the network entity;
transmitting, to the UE in response to the first acquisition message, a second acquisition message indicating that the first cell is available; and
establishing the connection with the UE via the first cell based at least in part on stored information within the UE associated with the first cell, the stored information indicating that the first cell is configured to support the communications between the UE and the network entity while the UE moves at the first speed.

13. The method of claim 12, wherein establishing the connection with the network entity comprises:
receiving, from the UE and using the first frequency, a request for the network entity to transmit a system information block corresponding to the first cell in response to transmitting the second acquisition message; and
transmitting, to the UE in response to the request, the system information block corresponding to the first cell, wherein the connection is established with the UE in accordance with the system information block.

14. A method for wireless communication at a network entity, comprising:
receiving, from a user equipment (UE), a first acquisition message associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed, wherein the first acquisition message requests for the network entity to indicate which cells are associated with the first frequency;
transmitting, to the UE in response to the first acquisition message, a second acquisition message indicating a set of cells associated with the first frequency, the set of cells comprising a first subset of cells including the first cell that are configured to support the communications between the UE and the network entity while the UE moves at the first speed and a second subset of cells including the second cell that are configured to support the communications between the UE and the network entity while the UE moves at the second speed; and
establishing the connection with the UE via the first cell based at least in part on stored information within the UE associated with the first cell, the stored information indicating that the first cell is configured to support the communications between the UE and the network entity while the UE moves at the first speed.

15. The method of claim 14, wherein establishing the connection with the network entity comprises:
receiving, from the UE and using the first frequency, a request for the network entity to transmit a system information block corresponding to the first cell based at least in part on the first cell being included in the first subset of cells; and
transmitting, to the UE in response to the request, the system information block corresponding to the first cell, wherein the connection is established with the UE in accordance with the system information block.

16. An apparatus for wireless communication at a user equipment (UE), comprising:
at least one processor; and
at least one memory coupled with the at least one processor, with instructions stored in the at least one memory, the instructions being executable by the at least one processor, individually or in any combination, to cause the apparatus to:
transmit, to a network entity, a first acquisition message associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed, wherein the first acquisition message requests for the network entity to indicate whether the first cell is available for establishing the connection with the network entity, and wherein the first acquisition message is transmitted based at least in part on the UE storing information associated with the first cell at the UE in a database used to track which frequencies are associated with cells that are configured to support the communications between the UE and the network entity while the UE moves at the first speed;
receive, from the network entity in response to the first acquisition message, a second acquisition message indicating that the first cell is available; and
establish the connection with the network entity via the first cell based at least in part on the stored information within the UE associated with the first cell, the stored information indicating that the first cell is configured to support the communications between the UE and the network entity while the UE moves at the first speed.

17. The apparatus of claim 16, wherein the instructions to establish the connection with the network entity are executable by the at least one processor, individually or in any combination, to cause the apparatus to:
transmit, to the network entity and using the first frequency, a request for the network entity to transmit a system information block corresponding to the first cell in response to receiving the second acquisition message; and
receive, from the network entity in response to the request, the system information block corresponding to the first cell, wherein the connection is established with the network entity in accordance with the system information block.

18. The apparatus of claim 16, wherein the first cell is associated with a first signal strength that is less than a second signal strength associated with the second cell, and the instructions are further executable by the at least one processor, individually or in any combination, to cause the apparatus to:
refrain from establishing the connection with the network entity via the second cell based at least in part on the stored information indicating that the first cell is configured to support the communications between the UE and the network entity while the UE moves at the first speed.

19. The apparatus of claim 16, wherein the instructions are further executable by the at least one processor, individually or in any combination, to cause the apparatus to:
select the first cell to use to establish the connection with the network entity from a database stored at the UE and used to track which frequencies are associated with cells that are configured to support the communications between the UE and the network entity while the UE moves at the first speed, the database storing the first frequency and the stored information associated with the first cell.

20. An apparatus for wireless communication at a user equipment (UE), comprising:
at least one processor; and
at least one memory coupled with the at least one processor, with instructions stored in the at least one memory, the instructions being executable by the at least one processor, individually or in any combination, to cause the apparatus to:
transmit, to a network entity, a first acquisition message associated with establishing a connection with the network entity using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed, wherein the first acquisition message requests for the network entity to indicate which cells are associated with the first frequency;
receive, from the network entity in response to the first acquisition message, a second acquisition message indicating a set of cells associated with the first frequency, the set of cells comprising a first subset of cells including the first cell that are configured to support the communications between the UE and the network entity while the UE moves at the first speed and a second subset of cells including the second cell that are configured to support the communications between the UE and the network entity while the UE moves at the second speed; and
establish the connection with the network entity via the first cell based at least in part on stored information within the UE associated with the first cell, the stored information indicating that the first cell is configured to support the communications between the UE and the network entity while the UE moves at the first speed.

21. The apparatus of claim 20, wherein the instructions to establish the connection with the network entity are executable by the at least one processor, individually or in any combination, to cause the apparatus to:
transmit, to the network entity and using the first frequency, a request for the network entity to transmit a system information block corresponding to the first cell based at least in part on the first cell being included in the first subset of cells; and
receive, from the network entity in response to the request, the system information block corresponding to the first cell, wherein the connection is established with the network entity in accordance with the system information block.

22. The apparatus of claim 20, wherein the instructions are further executable by the at least one processor, individually or in any combination, to cause the apparatus to:
filter the set of cells to remove the second subset of cells from the set of cells; and
order the first subset of cells from a cell associated with a greatest signal strength to a cell associated with a lowest signal strength relative to other signal strengths associated with remaining cells of the first subset of cells, wherein the connection is established with the network entity via the first cell in accordance with an order of the first subset of cells.

23. An apparatus for wireless communication at a network entity, comprising:
at least one processor; and
at least one memory coupled with the at least one processor, with instructions stored in the at least one memory, the instructions being executable by the at least one processor, individually or in any combination, to cause the apparatus to:
receive, from a user equipment (UE), a first acquisition message associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed, wherein the first acquisition message requests for the network entity to indicate whether the first cell is available for establishing the connection with the network entity;
transmit, to the UE in response to the first acquisition message, a second acquisition message indicating that the first cell is available; and
establish the connection with the UE via the first cell based at least in part on stored information within the UE associated with the first cell, the stored information indicating that the first cell is configured to support the communications between the UE and the network entity while the UE moves at the first speed.

24. The apparatus of claim 23, wherein the instructions to establish the connection with the network entity are executable by the at least one processor, individually or in any combination, to cause the apparatus to:
receive, from the UE and using the first frequency, a request for the network entity to transmit a system information block corresponding to the first cell in response to transmitting the second acquisition message; and
transmit, to the UE in response to the request, the system information block corresponding to the first cell, wherein the connection is established with the UE in accordance with the system information block.

25. An apparatus for wireless communication at a network entity, comprising:
at least one processor; and
at least one memory coupled with the at least one processor, with instructions stored in the at least one memory, the instructions being executable by the at least one processor, individually or in any combination, to cause the apparatus to:
receive, from a user equipment (UE), a first acquisition message associated with establishing a connection with the UE using a first frequency, the first frequency associated with a first cell configured to support communications between the UE and the network entity while the UE moves at a first speed that satisfies a threshold and a second cell configured to support communications between the UE and the network entity while the UE moves at a second speed that is less than the first speed, wherein the first acquisition message requests for the network entity to indicate which cells are associated with the first frequency;
transmit, to the UE in response to the first acquisition message, a second acquisition message indicating a set of cells associated with the first frequency, the set of cells comprising a first subset of cells including the first cell that are configured to support the communications between the UE and the network entity while the UE moves at the first speed and a second subset of cells including the second cell that are configured to support the communications between the UE and the network entity while the UE moves at the second speed; and
establish the connection with the UE via the first cell based at least in part on stored information within the UE associated with the first cell, the stored information indicating that the first cell is configured to support the communications between the UE and the network entity while the UE moves at the first speed.

26. The apparatus of claim 25, wherein the instructions to establish the connection with the network entity are executable by the at least one processor, individually or in any combination, to cause the apparatus to:
receive, from the UE and using the first frequency, a request for the network entity to transmit a system information block corresponding to the first cell based at least in part on the first cell being included in the first subset of cells; and
transmit, to the UE in response to the request, the system information block corresponding to the first cell, wherein the connection is established with the UE in accordance with the system information block.

* * * * *